United States Patent
Takegami et al.

(10) Patent No.: US 12,352,477 B2
(45) Date of Patent: Jul. 8, 2025

(54) REFRIGERATION APPARATUS-USE UNIT, HEAT SOURCE UNIT, AND REFRIGERATION APPARATUS

(71) Applicant: DAIKIN INDUSTRIES, LTD., Osaka (JP)

(72) Inventors: Masaaki Takegami, Osaka (JP); Shuuichi Taguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 914 days.

(21) Appl. No.: 17/480,777

(22) Filed: Sep. 21, 2021

(65) Prior Publication Data
US 2022/0003463 A1 Jan. 6, 2022

Related U.S. Application Data

(63) Continuation of application No. PCT/JP2020/003763, filed on Jan. 31, 2020.

(30) Foreign Application Priority Data

Mar. 29, 2019 (JP) .................................. 2019-066036

(51) Int. Cl.
F25B 13/00 (2006.01)
F25B 41/20 (2021.01)
(Continued)

(52) U.S. Cl.
CPC .............. *F25B 41/24* (2021.01); *F25B 13/00* (2013.01); *F25B 41/20* (2021.01); *F25B 41/26* (2021.01);
(Continued)

(58) Field of Classification Search
CPC .......... F25B 41/24; F25B 41/26; F25B 41/20; F25B 13/00
(Continued)

(56) References Cited

U.S. PATENT DOCUMENTS

| 2005/0115271 A1* | 6/2005 | Takegami | ............... F25B 13/00 |
| | | | 62/228.5 |
| 2007/0074523 A1* | 4/2007 | Takegami | ............... F25B 47/02 |
| | | | 62/157 |

(Continued)

FOREIGN PATENT DOCUMENTS

| JP | 2003-240391 A | 8/2003 |
| JP | 2004-44921 A | 2/2004 |

(Continued)

OTHER PUBLICATIONS

International Preliminary Report on Patentability and English translation of the Written Opinion of the International Searching Authority dated Sep. 28. 2021 for Application No. PCT/JP2020/003763.
(Continued)

*Primary Examiner* — Joel M Attey
(74) *Attorney, Agent, or Firm* — Birch, Stewart, Kolasch & Birch, LLP

(57) ABSTRACT

A switching mechanism (TV1, TV2, TV3, TV4, FV) includes an electric motor (74), a flow path switching portion (71) to be driven by the electric motor (74), a first port (P1) connected to a high-pressure flow path (7, 24, 28b, 31, 32) of a refrigerant circuit (6), a second port (P2) connected to a low-pressure flow path (8, 25, 28a, 33, 34) of the refrigerant circuit (6), and a third port (P3) connected to a predetermined flow path of the refrigerant circuit (6). The switching mechanism (TV1, TV2, TV3, TV4, FV) is switched between a first state in which the first port (P1) communicates with the third port (P3) and a second state in which the second port (P2) communicates with the third port (P3) in such a manner that the electric motor (74) drives the flow path switching portion (71).

11 Claims, 16 Drawing Sheets

(51) Int. Cl.
*F25B 41/24* (2021.01)
*F25B 41/26* (2021.01)

(52) U.S. Cl.
CPC . *F25B 2313/007* (2013.01); *F25B 2313/0231* (2013.01); *F25B 2313/0233* (2013.01); *F25B 2313/02732* (2013.01); *F25B 2313/02741* (2013.01); *F25B 2313/0291* (2013.01)

(58) Field of Classification Search
USPC ........................................................ 62/324.6
See application file for complete search history.

(56) References Cited

U.S. PATENT DOCUMENTS

| | | | |
|---|---|---|---|
| 2010/0043467 A1* | 2/2010 | Kawano | F25B 13/00 62/129 |
| 2012/0180890 A1 | 7/2012 | Kojima et al. | |
| 2015/0288014 A1* | 10/2015 | Na | H01M 8/04067 429/434 |
| 2016/0265819 A1* | 9/2016 | Durrani | F25B 25/005 |
| 2020/0132314 A1 | 4/2020 | Kojima | |

FOREIGN PATENT DOCUMENTS

| | | |
|---|---|---|
| JP | 2011-94768 A | 5/2011 |
| JP | 2013-210150 A | 10/2013 |
| WO | WO 2011/039918 A1 | 4/2011 |
| WO | WO 2013/093966 A1 | 6/2013 |
| WO | WO 2016/013393 A1 | 1/2016 |
| WO | WO 2019/017351 A1 | 1/2019 |

OTHER PUBLICATIONS

Extended European Search Report for European Application No. 20782150.5, dated Mar. 22, 2022.
International Search Report (PCT/ISA/210) issued in PCT/JP2020/003763 mailed on Mar. 17, 2020.

* cited by examiner

COOLING-FACILITY OPERATION

FIG.4 COOLING OPERATION (DEFROSTING OPERATION)

FIG.5 COOLING AND COOLING-FACILITY OPERATION

FIG.6 HEATING OPERATION

FIG.7 HEATING AND COOLING-FACILITY OPERATION

FIG.8 HEATING AND COOLING-FACILITY HEAT RECOVERY OPERATION

FIG.9 HEATING AND COOLING-FACILITY WASTE HEAT OPERATION

FIG.13 COOLING OPERATION

FIG.15 SIMULTANEOUS COOLING AND HEATING OPERATION

REFRIGERATION APPARATUS-USE UNIT, HEAT SOURCE UNIT, AND REFRIGERATION APPARATUS

CROSS REFERENCE TO RELATED APPLICATIONS

This application is a Continuation of PCT International Application No. PCT/JP2020/003763, filed on Jan. 31, 2020, which claims priority under 35 U.S.C § 119(a) to Japanese Patent Application No. 2019-066036, filed on Mar. 29, 2019. Each of the above applications is hereby expressly incorporated by reference, in its entirety, into the present application.

TECHNICAL FIELD

The present disclosure relates to a refrigeration apparatus-use unit, a heat source unit, and a refrigeration apparatus.

BACKGROUND ART

Patent Literature 1 discloses a refrigeration apparatus that includes a refrigerant circuit including a compressor, a heat source-side heat exchanger, a utilization-side heat exchanger, and a four-way switching valve. In the refrigerant circuit, state switching of the four-way switching valve enables switching of a refrigerant flow path.

CITATION LIST

Patent Literature

Patent Literature 1: JP 2004-044921 A

SUMMARY

A first aspect is directed to a refrigeration apparatus-use unit for a refrigeration apparatus (1) including a refrigerant circuit (6) configured to perform a refrigeration cycle in which a pressure above a critical pressure is applied to a refrigerant. The refrigeration apparatus-use unit includes a switching mechanism (TV1, TV2, TV3, TV4, FV) configured to switch a flow path of the refrigerant in the refrigerant circuit (6). The switching mechanism (TV1, TV2, TV3, TV4, FV) includes an electric motor (74), a flow path switching portion (71) to be driven by the electric motor (74), a first port (P1) connected to a high-pressure flow path (7, 24, 28b, 31, 32) of the refrigerant circuit (6), a second port (P2) connected to a low-pressure flow path (8, 25, 28a, 33, 34) of the refrigerant circuit (6), and a third port (P3) connected to a predetermined flow path of the refrigerant circuit (6). The switching mechanism (TV1, TV2, TV3, TV4, FV) is switched to a first state in which the first port (P1) communicates with the third port (P3) or a second state in which the second port (P2) communicates with the third port (P3), in such a manner that the electric motor (74) drives the flow path switching portion (71).

BRIEF DESCRIPTION OF THE DRAWINGS

In FIG. 2, (A) illustrates a first state of the three-way valve.
In FIG. 2, (B) illustrates a second state of the three-way valve.

DESCRIPTION OF EMBODIMENTS

Embodiments will be described below with reference to the drawings. The following embodiments are preferable examples in nature, and are not intended to limit the scope of the present invention, the application of the present invention, or the use of the present invention.

First Embodiment

General Configuration

A refrigeration apparatus (1) according to a first embodiment is configured to cool a cooling target and condition indoor air at the same time. The term "cooling target" as used herein may involve air in a facility such as a refrigerator, a freezer, or a showcase. In the following description, such a facility is referred to as a cooling facility.

Figure 1:
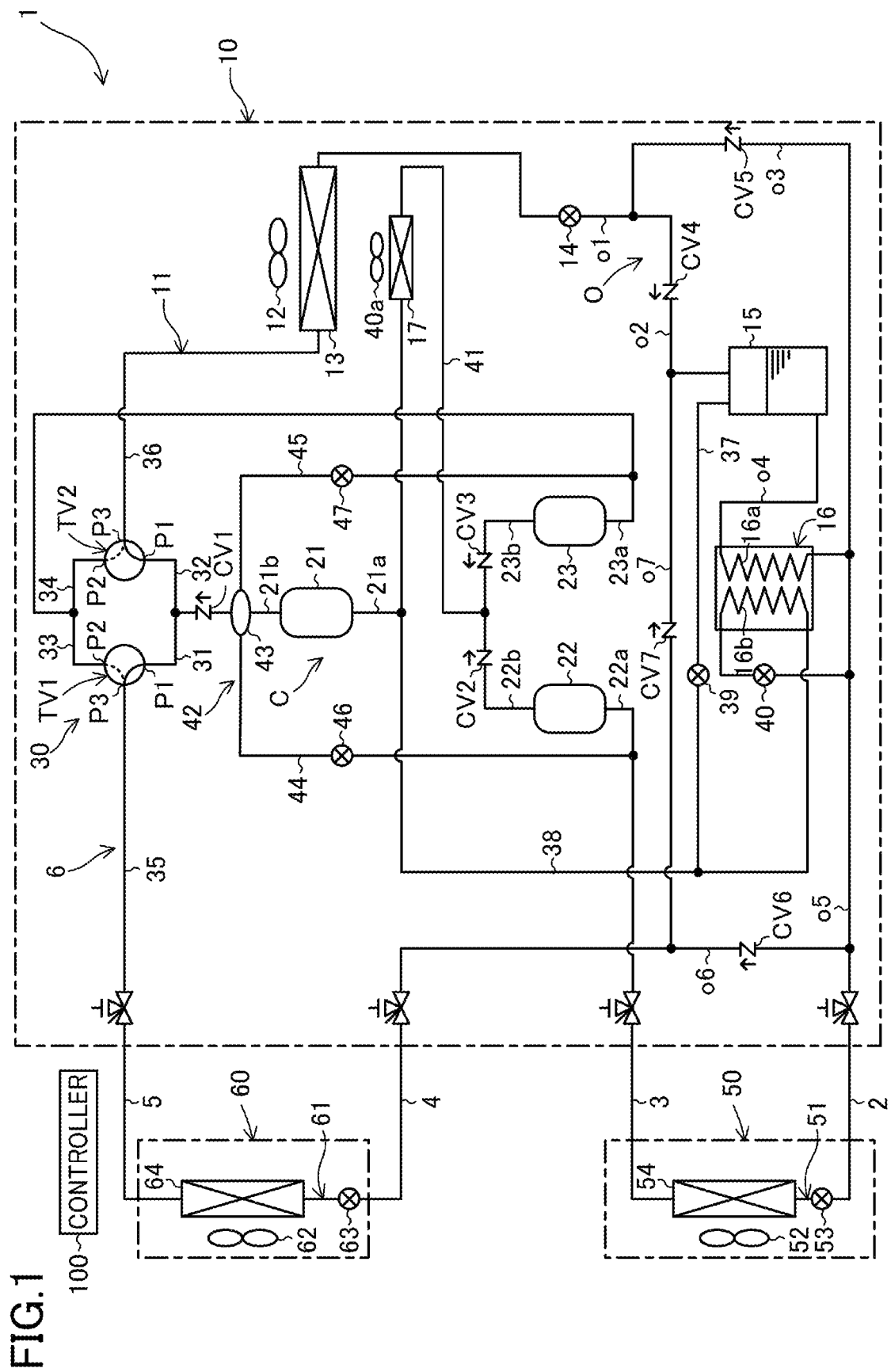
FIG. 1 is a diagram of a piping system in a refrigeration apparatus according to a first embodiment.

As illustrated in FIG. 1, the refrigeration apparatus (1) includes an outdoor unit (10) installed outdoors, a cooling facility unit (50) configured to cool inside air, an indoor unit (60) configured to condition indoor air, and a controller (100). The refrigeration apparatus (1) does not necessarily include one cooling facility unit (50) and one indoor unit (60). For example, the refrigeration apparatus (1) may include two or more cooling facility units (50) and two or more indoor units (60). These units (10, 50, 60) are connected via four connection pipes (2, 3, 4, 5) to constitute a refrigerant circuit (6).

The four connection pipes (2, 3, 4, 5) include a first liquid connection pipe (2), a first gas connection pipe (3), a second liquid connection pipe (4), and a second gas connection pipe (5). The first liquid connection pipe (2) and the first gas connection pipe (3) are provided for the cooling facility unit (50). The second liquid connection pipe (4) and the second gas connection pipe (5) are provided for the indoor unit (60).

A refrigeration cycle is achieved in such a manner that a refrigerant circulates through the refrigerant circuit (6). In the first embodiment, the refrigerant in the refrigerant circuit (6) is carbon dioxide. The refrigerant circuit (6) is configured to perform a refrigeration cycle in which a pressure above a critical pressure is applied to the refrigerant.

Outdoor Unit

The outdoor unit (10) is a heat source unit to be installed outdoors. The outdoor unit (10) includes an outdoor fan (12) and an outdoor circuit (11). The outdoor circuit (11) includes a compression unit (C), a switching unit (30), an outdoor heat exchanger (13), an outdoor expansion valve (14), a receiver (15), a cooling heat exchanger (16), and an intermediate cooler (17).

In the first embodiment, the outdoor unit (10) is a refrigeration apparatus-use unit including a switching mechanism (TV1, TV2).

Compression Unit

The compression unit (C) is configured to compress the refrigerant. The compression unit (C) includes a first compressor (21), a second compressor (22), and a third compressor (23). The compression unit (C) is of a two-stage compression type. The second compressor (22) and the third compressor (23) constitute a lower stage-side compressor. The second compressor (22) and the third compressor (23) are connected in parallel. The first compressor (21) constitutes a higher stage-side compressor. The first compressor (21) and the second compressor (22) are connected in series. The first compressor (21) and the third compressor (23) are connected in series. Each of the first compressor (21), the second compressor (22), and the third compressor (23) is a rotary compressor that includes a compression mechanism to be driven by a motor. Each of the first compressor (21), the second compressor (22), and the third compressor (23) is of a variable capacity type, and the operating frequency or the number of rotations of each compressor is adjustable.

A first suction pipe (21a) and a first discharge pipe (21b) are connected to the first compressor (21). A second suction pipe (22a) and a second discharge pipe (22b) are connected to the second compressor (22). A third suction pipe (23a) and a third discharge pipe (23b) are connected to the third compressor (23).

The second suction pipe (22a) communicates with the cooling facility unit (50). The second compressor (22) is a cooling facility-side compressor provided for the cooling facility unit (50). The third suction pipe (23a) communicates with the indoor unit (60). The third compressor (23) is an indoor-side compressor provided for the indoor unit (60).

Switching Unit

The switching unit (30) is configured to switch a refrigerant flow path. The switching unit (30) includes a first pipe (31), a second pipe (32), a third pipe (33), a fourth pipe (34), a first three-way valve (TV1), and a second three-way valve (TV2). The first pipe (31) has an inlet end connected to the first discharge pipe (21b). The second pipe (32) has an inlet end connected to the first discharge pipe (21b). Each of the first pipe (31) and the second pipe (32) is a pipe on which a discharge pressure of the compression unit (C) acts. The third pipe (33) has an outlet end connected to the third suction pipe (23a) of the third compressor (23). The fourth pipe (34) has an outlet end connected to the third suction pipe (23a) of the third compressor (23). Each of the third pipe (33) and the fourth pipe (34) is a pipe on which a suction pressure of the compression unit (C) acts.

The first three-way valve (TV1) has a first port (P1), a second port (P2), and a third port (P3). The first port (P1) of the first three-way valve (TV1) is connected to an outlet end of the first pipe (31) serving as a high-pressure flow path. The second port (P2) of the first three-way valve (TV1) is connected to an inlet end of the third pipe (33) serving as a low-pressure flow path. The third port (P3) of the first three-way valve (TV1) is connected to an indoor gas-side flow path (35).

The second three-way valve (TV2) has a first port (P1), a second port (P2), and a third port (P3). The first port (P1) of the second three-way valve (TV2) is connected to an outlet end of the second pipe (32) serving as a high-pressure flow path. The second port (P2) of the second three-way valve (TV2) is connected to an inlet end of the fourth pipe (34) serving as a low-pressure flow path. The third port (P3) of the second three-way valve (TV2) is connected to an outdoor gas-side flow path (36).

Each of the first three-way valve (TV1) and the second three-way valve (TV2) is an electrically driven three-way valve. Each three-way valve (TV1, TV2) is switched between a first state (a state indicated by a solid line in FIG. 1) and a second state (a state indicated by a broken line in FIG. 1). In each three-way valve (TV1, TV2) switched to the first state, the first port (P1) and the third port (P3) communicate with each other and the second port (P2) is closed. In each three-way valve (TV1, TV2) switched to the second state, the second port (P2) and the third port (P3) communicate with each other and the first port (P1) is closed.

Outdoor Heat Exchanger

The outdoor heat exchanger (13) serves as a heat source-side heat exchanger. The outdoor heat exchanger (13) is a fin-and-tube air heat exchanger. The outdoor fan (12) is disposed near the outdoor heat exchanger (13). The outdoor fan (12) is configured to provide outdoor air. The outdoor heat exchanger causes the refrigerant flowing therethrough to exchange heat with the outdoor air provided by the outdoor fan (12).

The outdoor heat exchanger (13) has a gas end to which the outdoor gas-side flow path (36) is connected. The outdoor heat exchanger (13) has a liquid end to which an outdoor flow path (O) is connected.

Outdoor Flow Path

The outdoor flow path (O) includes an outdoor first pipe (o1), an outdoor second pipe (o2), an outdoor third pipe (o3), an outdoor fourth pipe (o4), an outdoor fifth pipe (o5), an outdoor sixth pipe (o6), and an outdoor seventh pipe (o7). The outdoor first pipe (o1) has a first end connected to the liquid end of the outdoor heat exchanger (13). The outdoor first pipe (o1) has a second end to which a first end of the outdoor second pipe (o2) and a first end of the outdoor third pipe (o3) are connected. The outdoor second pipe (o2) has a second end connected to a top portion of the receiver (15). The outdoor fourth pipe (o4) has a first end connected to a bottom portion of the receiver (15). The outdoor fourth pipe (o4) has a second end to which a first end of the outdoor fifth pipe (o5) and a second end of the outdoor third pipe (o3) are connected. The outdoor fifth pipe (o5) has a second end connected to the first liquid connection pipe (2). The outdoor sixth pipe (o6) has a first end connected to a point between the two ends of the outdoor fifth pipe (o5). The outdoor sixth pipe (o6) has a second end connected to the second liquid connection pipe (4). The outdoor seventh pipe (o7) has a first end connected to a point between the two ends of the outdoor sixth pipe (o6). The outdoor seventh pipe (o7) has a second end connected to a point between the two ends of the outdoor second pipe (o2).

Outdoor Expansion Valve

The outdoor expansion valve (14) is connected to the outdoor first pipe (o1). The outdoor expansion valve (14) is a decompression mechanism configured to decompress the refrigerant. The outdoor expansion valve (14) is a heat source expansion valve. The outdoor expansion valve (14) is an opening degree-changeable electronic expansion valve.

Receiver

The receiver (15) serves as a container configured to store the refrigerant. The receiver (15) separates the refrigerant into the gas refrigerant and the liquid refrigerant. The receiver (15) has the top portion to which the second end of the outdoor second pipe (o2) and a first end of a degassing pipe (37) are connected. The degassing pipe (37) has a second end connected to a point between two ends of an injection pipe (38). A degassing valve (39) is connected to the degassing pipe (37). The degassing valve (39) is an opening degree-changeable electronic expansion valve.

Cooling Heat Exchanger

The cooling heat exchanger (16) is configured to cool the refrigerant (mainly the liquid refrigerant) separated by the receiver (15). The cooling heat exchanger (16) includes a first refrigerant flow path (16a) and a second refrigerant flow path (16b). The first refrigerant flow path (16a) is connected to a point between the two ends of the outdoor fourth pipe (o4). The second refrigerant flow path (16b) is connected to a point between the two ends of the injection pipe (38).

The injection pipe (38) has a first end connected to a point between the two ends of the outdoor fifth pipe (o5). The injection pipe (38) has a second end connected to the first suction pipe (21a) of the first compressor (21). In other words, the injection pipe (38) has a second end connected to an intermediate pressure portion of the compression unit (C). The injection pipe (38) is provided with a reducing valve (40) located upstream of the second refrigerant flow path (16b). The reducing valve (40) is an opening degree-changeable expansion valve.

The cooling heat exchanger (16) causes the refrigerant flowing through the first refrigerant flow path (16a) to exchange heat with the refrigerant flowing through the second refrigerant flow path (16b). The refrigerant decompressed by the reducing valve (40) flows through the second refrigerant flow path (16b). Therefore, the cooling heat exchanger (16) cools the refrigerant flowing through the first refrigerant flow path (16a).

Intermediate Cooler

The intermediate cooler (17) is connected to an intermediate flow path (41). The intermediate flow path (41) has a first end connected to the second discharge pipe (22b) of the second compressor (22) and the third discharge pipe (23b) of the third compressor (23). The intermediate flow path (41) has a second end connected to the first suction pipe (21a) of the first compressor (21). In other words, the intermediate flow path (41) has a second end connected to the intermediate pressure portion of the compression unit (C).

The intermediate cooler (17) is a fin-and-tube air heat exchanger. A cooling fan (17a) is disposed near the intermediate cooler (17). The intermediate cooler (17) causes the refrigerant flowing therethrough to exchange heat with outdoor air provided by the cooling fan (17a).

Oil Separation Circuit

The outdoor circuit (11) includes an oil separation circuit (42). The oil separation circuit (42) includes an oil separator (43), a first oil return pipe (44), and a second oil return pipe (45). The oil separator (43) is connected to the first discharge pipe (21b) of the first compressor (21). The oil separator (43) is configured to separate oil from the refrigerant discharged from the compression unit (C). The first oil return pipe (44) has an inlet end connected to the oil separator (43). The first oil return pipe (44) has an outlet end connected to the second suction pipe (22a) of the second compressor (22). The second oil return pipe (45) has an outlet end connected to the third suction pipe (23a) of the third compressor (23). A first oil regulation valve (46) is connected to the first oil return pipe (44). A second oil regulation valve (47) is connected to the second oil return pipe (45).

The oil separated by the oil separator (43) is returned to the second compressor (22) via the first oil return pipe (44). The oil separated by the oil separator (43) is returned to the third compressor (23) via the second oil return pipe (45). The oil separated by the oil separator (43) may be directly returned to an oil reservoir in a casing of the second compressor (22). The oil separated by the oil separator (43) may be directly returned to an oil reservoir in a casing of the third compressor (23).

Check Valve

The outdoor circuit (11) includes a first check valve (CV1), a second check valve (CV2), a third check valve (CV3), a fourth check valve (CV4), a fifth check valve (CV5), a sixth check valve (CV6), and a seventh check valve (CV7). The first check valve (CV1) is connected to the first discharge pipe (21b). The second check valve (CV2) is connected to the second discharge pipe (22b). The third check valve (CV3) is connected to the third discharge pipe (23b). The fourth check valve (CV4) is connected to the outdoor second pipe (o2). The fifth check valve (CV5) is connected to the outdoor third pipe (o3). The sixth check valve (CV6) is connected to the outdoor sixth pipe (o6). The seventh check valve (CV7) is connected to the outdoor seventh pipe (o7). These check valves (CV1 to CV7) each allow the flow of the refrigerant in a direction indicated by an arrow in FIG. 1 and prohibit the flow of the refrigerant in the opposite direction to the direction indicated by the arrow in FIG. 1.

Cooling Facility Unit

The cooling facility unit (50) is a utilization unit to be installed in, for example, a cold storage warehouse. The cooling facility unit (50) includes an inside fan (52) and a cooling facility circuit (51). The cooling facility circuit (51) has a liquid end to which the first liquid connection pipe (2)

is connected. The cooling facility circuit (51) has a gas end to which the first gas connection pipe (3) is connected.

The cooling facility circuit (51) includes a cooling facility expansion valve (53) and a cooling facility heat exchanger (54) arranged in this order from the liquid end toward the gas end. The cooling facility expansion valve (53) is a first utilization-side expansion valve. The cooling facility expansion valve (53) serves as an opening degree-changeable electronic expansion valve.

The cooling facility heat exchanger (54) is a first utilization-side heat exchanger. The cooling facility heat exchanger (54) is a fin-and-tube air heat exchanger. The inside fan (52) is disposed near the cooling facility heat exchanger (54). The inside fan (52) is configured to provide inside air. The cooling facility heat exchanger (54) causes the refrigerant flowing therethrough to exchange heat with the inside air provided by the inside fan (52).

Indoor Unit

The indoor unit (60) is a utilization unit to be installed indoors. The indoor unit (60) includes an indoor fan (62) and an indoor circuit (61). The indoor circuit (61) has a liquid end to which the second liquid connection pipe (4) is connected. The indoor circuit (61) has a gas end to which the second gas connection pipe (5) is connected.

The indoor circuit (61) includes an indoor expansion valve (63) and an indoor heat exchanger (64) arranged in this order from the liquid end toward the gas end. The indoor expansion valve (63) is a second utilization-side expansion valve. The indoor expansion valve (63) is an opening degree-changeable electronic expansion valve.

The indoor heat exchanger (64) is a second utilization-side heat exchanger. The indoor heat exchanger (64) is a fin-and-tube air heat exchanger. The indoor fan (62) is disposed near the indoor heat exchanger (64). The indoor fan (62) is configured to provide indoor air. The indoor heat exchanger (64) causes the refrigerant flowing therethrough to exchange heat with the indoor air provided by the indoor fan (62).

Sensor

The refrigeration apparatus (1) includes various sensors (not illustrated). These sensors are configured to detect indices such as a temperature and a pressure of the high-pressure refrigerant in the refrigerant circuit (6), a temperature and a pressure of the low-pressure refrigerant in the refrigerant circuit (6), a temperature and a pressure of the intermediate-pressure refrigerant in the refrigerant circuit (6), a temperature of the refrigerant in the outdoor heat exchanger (13), a temperature of the refrigerant in the cooling facility heat exchanger (54), a temperature of the refrigerant in the indoor heat exchanger (64), a degree of superheating of the refrigerant sucked in the second compressor (22), a degree of superheating of the refrigerant sucked in the third compressor (23), a degree of superheating of the refrigerant discharged from each of the first to third compressors (C1, C2, C3), a temperature of the outdoor air, a temperature of the inside air, and a temperature of the indoor air.

Controller

The controller (100) is a control unit. The controller (100) includes a microcomputer mounted on a control board, and a memory device (specifically, a semiconductor memory) storing software for operating the microcomputer. The controller (100) is configured to control the respective components of the refrigeration apparatus (1), based on an operation command and a detection signal from a sensor. The controller (100) controls the respective components, thereby changing an operation of the refrigeration apparatus (1).

Switching Mechanism

Figure 2:
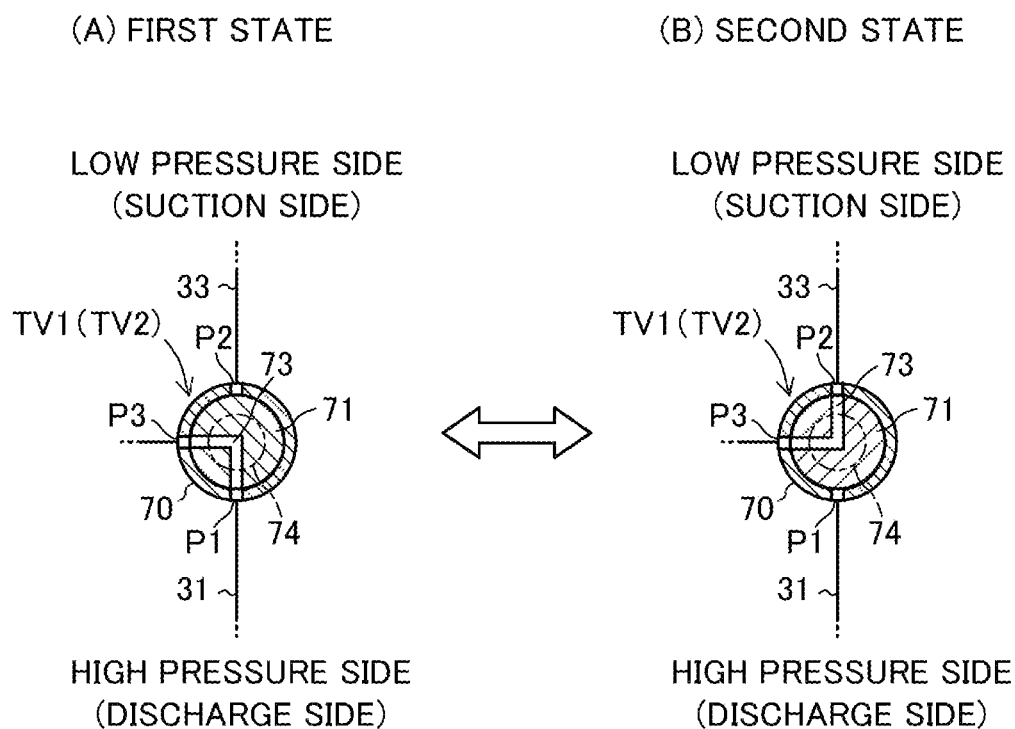
FIG. 2 is a diagram of a schematic configuration of a three-way valve.

The first three-way valve (TV1) and the second three-way valve (TV2) constitute a switching mechanism. With reference to FIG. 2, a description will be given of a configuration of the switching mechanism. The first three-way valve (TV1) is equal in structure to the second three-way valve (TV2); therefore, the first three-way valve (TV1) is described below.

The first three-way valve (TV1) is an electrically driven rotary-type valve. The first three-way valve (TV1) includes a housing (70) having a tubular shape and a flow path switching portion (71) disposed in the housing (70). The flow path switching portion (71) is held in the housing (70) in a rotatable manner.

The housing (70) has a first port (P1), a second port (P2), and a third port (P3). The first port (P1) is connected to the high-pressure flow path (the first discharge pipe (21b)). The second port (P2) is connected to the low-pressure flow path (the third suction pipe (23a)). The third port (P3) is connected to a predetermined flow path.

The flow path switching portion (71) includes an internal flow path (73) through which the ports (P1, P2, P3) communicate with one another. In the first embodiment, the internal flow path (73) has a substantially "L" shape as seen in normal sectional view; however, the shape of the internal flow path (73) is not limited thereto.

As indicated by a chain double-dashed line in FIG. 2, the first three-way valve (TV1) includes an electric motor (74). The electric motor (74) is coupled to the flow path switching portion (71) via a drive shaft (not illustrated). The electric motor (74) drives the flow path switching portion (71) to rotate the flow path switching portion (71). In the first state (A) illustrated in FIG. 2, the first port (P1) and the third port (P3) communicate with each other via the internal flow path (73). The second port (P2) is closed by an outer peripheral face of the flow path switching portion (71). In this state, when the electric motor (74) drives the flow path switching portion (71) to rotate the flow path switching portion (71), the first three-way valve (TV1) is switched to the second state. In the second state (B) illustrated in FIG. 2, the second port (P2) and the third port (P3) communicate with each other via the internal flow path (73). The first port (P1) is closed by the outer peripheral face of the flow path switching portion (71). When the electric motor (74) rotates the flow path switching portion (71) in reverse, the first three-way valve (TV1) in the second state returns to the first state.

As described above, when the electric motor (74) rotates the flow path switching portion (71) in the normal and reverse directions, the first three-way valve (TV1) is switched between the first state and the second state. The second three-way valve (TV2) is equal in structure to the first three-way valve (TV1).

Operations

Next, a specific description will be given of operations to be carried out by the refrigeration apparatus (1). The operations of the refrigeration apparatus (1) include a cooling-facility operation, a cooling operation, a cooling and cooling-facility operation, a heating operation, a heating and cooling-facility operation, a heating and cooling-facility heat recovery operation, a heating and cooling-facility waste heat operation, and a defrosting operation.

During the cooling-facility operation, the cooling facility unit (50) operates, while the indoor unit (60) stops. During the cooling operation, the cooling facility unit (50) stops, while the indoor unit (60) cools the indoor air. During the cooling and cooling-facility operation, the cooling facility unit (50) operates, while the indoor unit (60) cools the indoor air. During the heating operation, the cooling facility unit (50) stops, while the indoor unit (60) heats the indoor air. During the heating and cooling-facility operation, the heating and cooling-facility heat recovery operation, and the heating and cooling-facility waste heat operation, the cooling facility unit (50) operates, while the indoor unit (60) heats the indoor air. During the defrosting operation, the cooling facility unit (50) operates to melt frost on a surface of the outdoor heat exchanger (13).

The heating and cooling-facility operation is carried out on a condition that a relatively large heating capacity is required for the indoor unit (60). The heating and cooling-facility waste heat operation is carried out on a condition that a relatively small heating capacity is required for the indoor unit (60). The heating and cooling-facility heat recovery operation is carried out on a condition that the heating capacity required for the indoor unit (60) falls within a range between a heating capacity required in the heating operation and a cooling capacity required in the cooling-facility operation (i.e., on a condition that the balance between the cooling capacity required in the cooling-facility operation and the heating capacity required in the heating operation is achieved).

Cooling-Facility Operation

Figure 3:
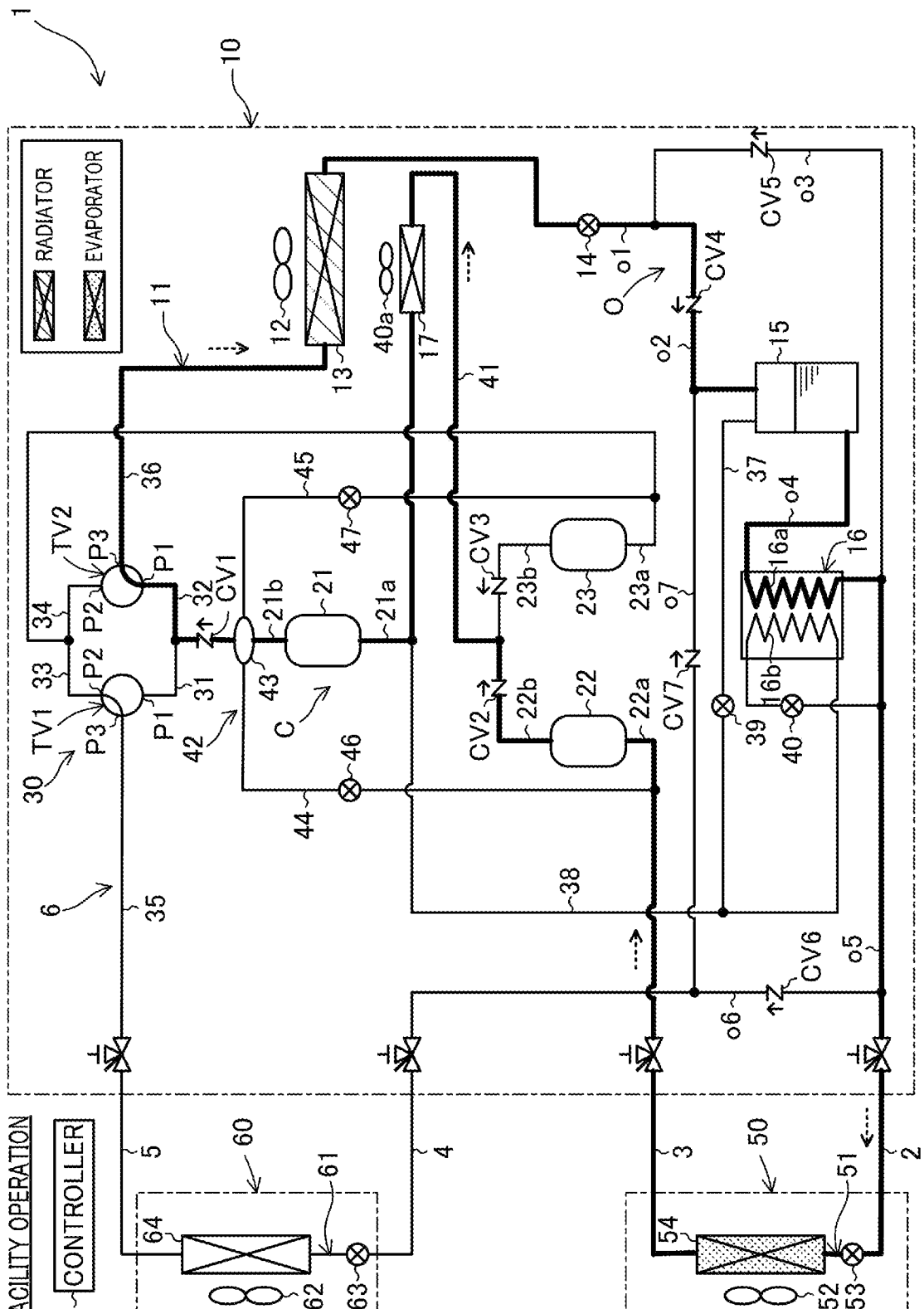
FIG. 3 is a diagram (equivalent to FIG. 1) of a flow of a refrigerant during a cooling-facility operation.

During the cooling-facility operation illustrated in FIG. 3, the first three-way valve (TV1) is in the second state, while the second three-way valve (TV2) is in the first state. The outdoor expansion valve (14) is opened at a predetermined opening degree. The opening degree of the cooling facility expansion valve (53) is adjusted by superheating control. The indoor expansion valve (63) is fully closed. The opening degree of the reducing valve (40) is appropriately adjusted. The outdoor fan (12) and the inside fan (52) operate, while the indoor fan (62) stops. The first compressor (21) and the second compressor (22) operate, while the third compressor (23) stops. During the cooling-facility operation, a refrigeration cycle is achieved, in which the compression unit (C) compresses the refrigerant, the outdoor heat exchanger (13) causes the refrigerant to dissipate heat, and the cooling facility heat exchanger (54) evaporates the refrigerant.

As illustrated in FIG. 3, the second compressor (22) compresses the refrigerant, the intermediate cooler (17) cools the refrigerant, and the first compressor (21) sucks in the refrigerant. After the first compressor (21) compresses the refrigerant, the outdoor heat exchanger (13) causes the refrigerant to dissipate heat. The refrigerant then flows through the receiver (15). Thereafter, the cooling heat exchanger (16) cools the refrigerant. After the cooling heat exchanger (16) cools the refrigerant, the cooling facility expansion valve (53) decompresses the refrigerant, and the cooling facility heat exchanger (54) evaporates the refrigerant. The inside air is thus cooled. After the cooling heat exchanger (16) evaporates the refrigerant, the second compressor (22) sucks in the refrigerant to compress the refrigerant again.

Cooling Operation

Figure 4:
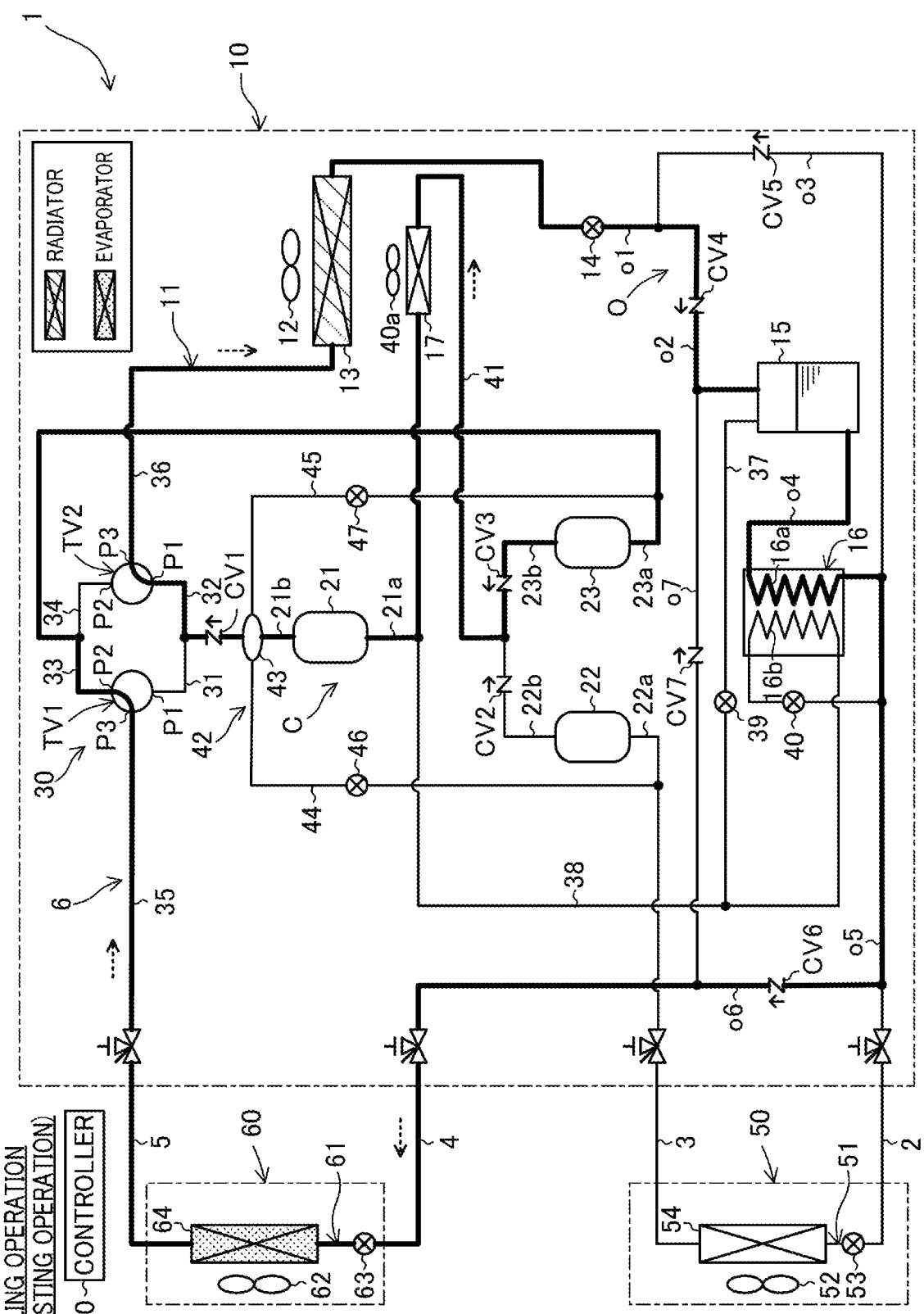
FIG. 4 is a diagram (equivalent to FIG. 1) of a flow of the refrigerant during a cooling operation.

During the cooling operation illustrated in FIG. 4, the first three-way valve (TV1) is in the second state, while the second three-way valve (TV2) is in the first state. The outdoor expansion valve (14) is opened at a predetermined opening degree. The cooling facility expansion valve (53) is fully closed. The opening degree of the indoor expansion valve (63) is adjusted by superheating control. The opening degree of the reducing valve (40) is appropriately adjusted. The outdoor fan (12) and the indoor fan (62) operate, while the inside fan (52) stops. The first compressor (21) and the third compressor (23) operate, while the second compressor (22) stops. During the cooling operation, a refrigeration cycle is achieved, in which the compression unit (C) compresses the refrigerant, the outdoor heat exchanger (13) causes the refrigerant to dissipate heat, and the indoor heat exchanger (64) evaporates the refrigerant.

As illustrated in FIG. 4, the third compressor (23) compresses the refrigerant, the intermediate cooler (17) cools the refrigerant, and the first compressor (21) sucks in the refrigerant. After the first compressor (21) compresses the refrigerant, the outdoor heat exchanger (13) causes the refrigerant to dissipate heat. The refrigerant then flows through the receiver (15). Thereafter, the cooling heat exchanger (16) cools the refrigerant. After the cooling heat exchanger (16) cools the refrigerant, the indoor expansion valve (63) decompresses the refrigerant, and the indoor heat exchanger (64) evaporates the refrigerant. The indoor air is thus cooled. After the indoor heat exchanger (64) evaporates the refrigerant, the third compressor (23) sucks in the refrigerant to compress the refrigerant again.

Cooling and Cooling-Facility Operation

Figure 5:
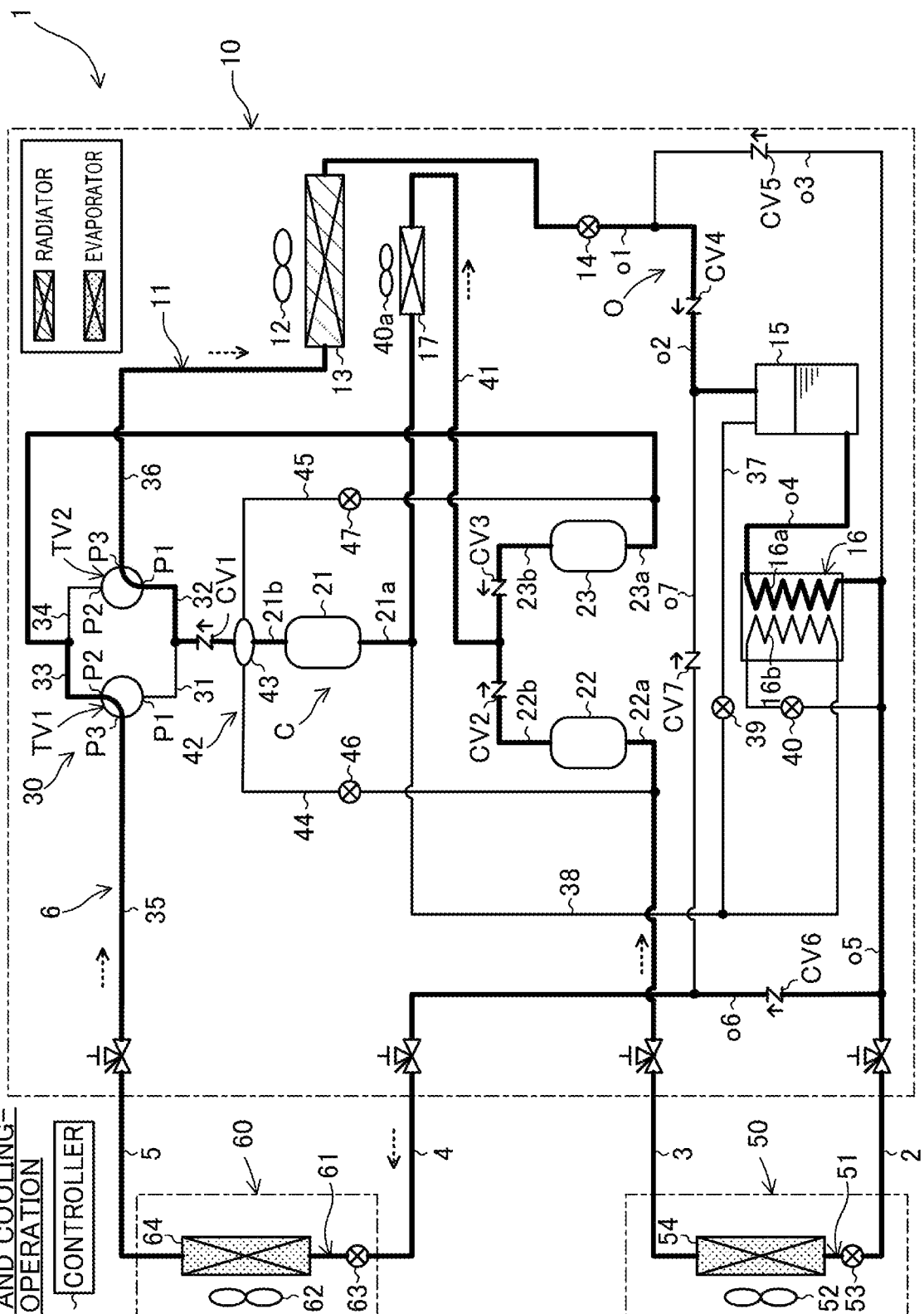
FIG. 5 is a diagram (equivalent to FIG. 1) of a flow of the refrigerant during a cooling and cooling-facility operation.

During the cooling and cooling-facility operation illustrated in FIG. 5, the first three-way valve (TV1) is in the second state, while the second three-way valve (TV2) is in the first state. The outdoor expansion valve (14) is opened at a predetermined opening degree. The opening degree of each of the cooling facility expansion valve (53) and the indoor expansion valve (63) is adjusted by superheating control. The opening degree of the reducing valve (40) is appropriately adjusted. The outdoor fan (12), the inside fan (52), and the indoor fan (62) operate. The first compressor (21), the second compressor (22), and the third compressor (23) operate. During the cooling and cooling-facility operation, a refrigeration cycle is achieved, in which the compression unit (C) compresses the refrigerant, the outdoor heat exchanger (13) causes the refrigerant to dissipate heat, and each of the cooling facility heat exchanger (54) and the indoor heat exchanger (64) evaporates the refrigerant.

As illustrated in FIG. 5, each of the second compressor (22) and the third compressor (23) compresses the refrigerant, the intermediate cooler (17) cools the refrigerant, and the first compressor (21) sucks in the refrigerant. After the first compressor (21) compresses the refrigerant, the outdoor heat exchanger (13) causes the refrigerant to dissipate heat. The refrigerant then flows through the receiver (15). Thereafter, the cooling heat exchanger (16) cools the refrigerant. After the cooling heat exchanger (16) cools the refrigerant, the refrigerant is diverted into the cooling facility unit (50) and the indoor unit (60). The cooling facility expansion valve (53) decompresses the refrigerant, and the cooling facility heat exchanger (54) evaporates the refrigerant. After the cooling facility heat exchanger (54) evaporates the refrigerant, the second compressor (22) sucks in the refrigerant to compress the refrigerant again. The indoor expansion valve (63) decompresses the refrigerant, and the indoor heat exchanger (64) evaporates the refrigerant. After the indoor heat exchanger (64) evaporates the refrigerant, the third compressor (23) sucks in the refrigerant to compress the refrigerant again.

Heating Operation

Figure 6:
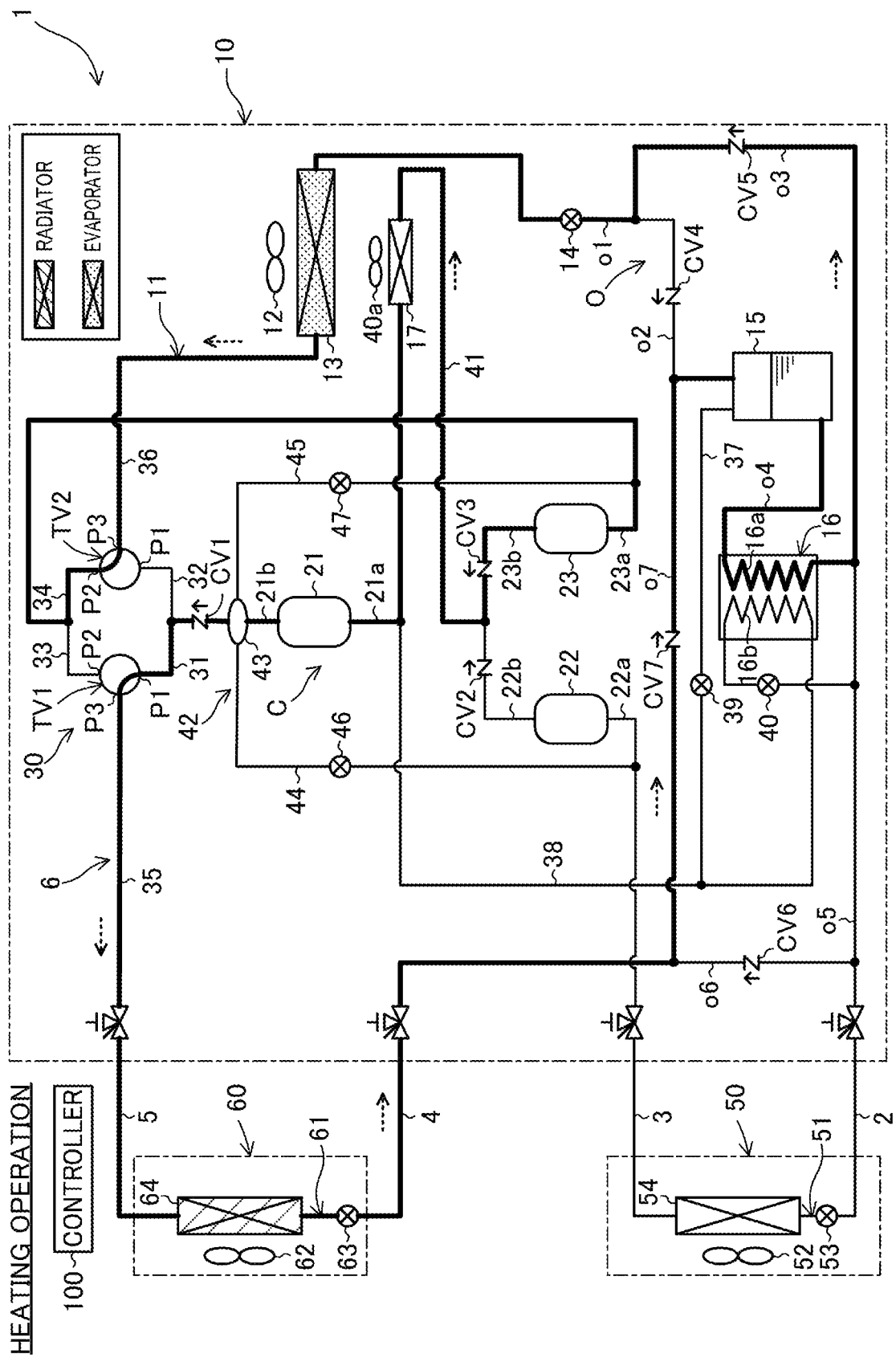
FIG. 6 is a diagram (equivalent to FIG. 1) of a flow of the refrigerant during a heating operation.

During the heating operation illustrated in FIG. 6, the first three-way valve (TV1) is in the first state, while the second three-way valve (TV2) is in the second state. The indoor expansion valve (63) is opened at a predetermined opening degree. The cooling facility expansion valve (53) is fully closed. The opening degree of the outdoor expansion valve (14) is adjusted by superheating control. The opening degree of the reducing valve (40) is appropriately adjusted. The outdoor fan (12) and the indoor fan (62) operate, while the inside fan (52) stops. The first compressor (21) and the third compressor (23) operate, while the second compressor (22) stops. During the heating operation, a refrigeration cycle is achieved, in which the compression unit (C) compresses the refrigerant, the indoor heat exchanger (64) causes the refrigerant to dissipate heat, and the outdoor heat exchanger (13) evaporates the refrigerant.

As illustrated in FIG. 6, the third compressor (23) compresses the refrigerant, the intermediate cooler (17) cools the refrigerant, and the first compressor (21) sucks in the refrigerant. After the first compressor (21) compresses the refrigerant, the indoor heat exchanger (64) causes the refrigerant to dissipate heat. The indoor air is thus heated. After the indoor heat exchanger (64) causes the refrigerant to dissipate heat, the refrigerant flows through the receiver (15). The cooling heat exchanger (16) then cools the refrigerant. After the cooling heat exchanger (16) cools the refrigerant, the outdoor expansion valve (14) decompresses the refrigerant, and the outdoor heat exchanger (13) evaporates the refrigerant. After the outdoor heat exchanger (13) evaporates the refrigerant, the third compressor (23) sucks in the refrigerant to compress the refrigerant again.

Heating and Cooling-Facility Operation

Figure 7:
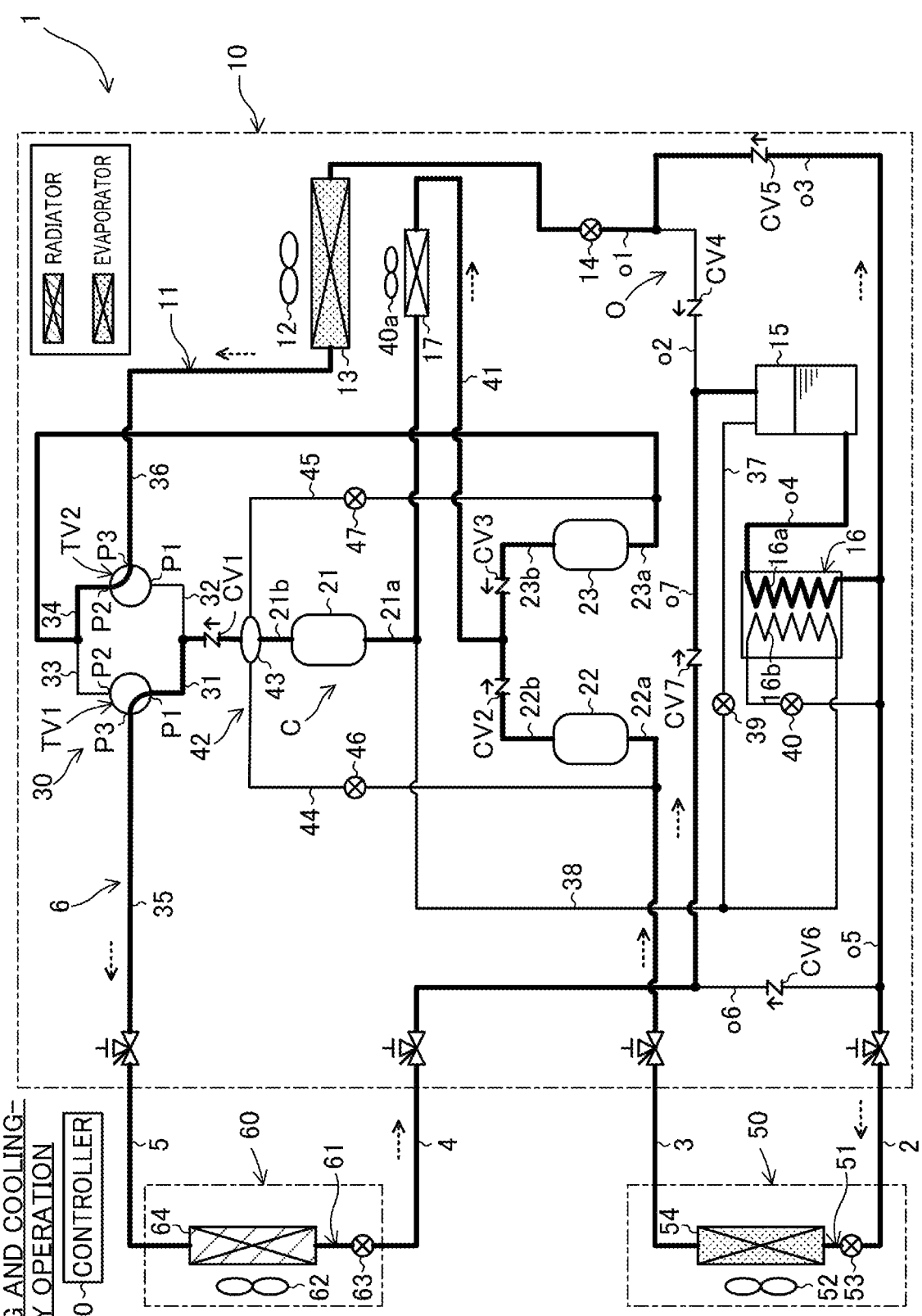
FIG. 7 is a diagram (equivalent to FIG. 1) of a flow of the refrigerant during a heating and cooling-facility operation.

During the heating and cooling-facility operation illustrated in FIG. 7, the first three-way valve (TV1) is in the first state, while the second three-way valve (TV2) is in the second state. The indoor expansion valve (63) is opened at a predetermined opening degree. The opening degree of each of the cooling facility expansion valve (53) and the outdoor expansion valve (14) is adjusted by superheating control. The opening degree of the reducing valve (40) is appropriately adjusted. The outdoor fan (12), the inside fan (52), and the indoor fan (62) operate. The first compressor (21), the second compressor (22), and the third compressor (23) operate. During the heating and cooling-facility operation, a refrigeration cycle is achieved, in which the compression unit (C) compresses the refrigerant, the indoor heat exchanger (64) causes the refrigerant to dissipate heat, and each of the cooling facility heat exchanger (54) and the outdoor heat exchanger (13) evaporates the refrigerant.

As illustrated in FIG. 7, each of the second compressor (22) and the third compressor (23) compresses the refrigerant, the intermediate cooler (17) cools the refrigerant, and the first compressor (21) sucks in the refrigerant. After the first compressor (21) compresses the refrigerant, the indoor heat exchanger (64) causes the refrigerant to dissipate heat. The indoor air is thus heated. After the indoor heat exchanger (64) causes the refrigerant to dissipate heat, the refrigerant flows through the receiver (15). The cooling heat exchanger (16) then cools the refrigerant. After the cooling heat exchanger (16) cools the refrigerant, the outdoor expansion valve (14) decompresses a part of the refrigerant, and the outdoor heat exchanger (13) evaporates the refrigerant. After the outdoor heat exchanger (13) evaporates the refrigerant, the third compressor (23) sucks in the refrigerant to compress the refrigerant again.

After the cooling heat exchanger (16) cools the refrigerant, the cooling facility expansion valve (53) decompresses the remaining refrigerant, and the cooling facility heat exchanger (54) evaporates the refrigerant. The inside air is thus cooled. After the cooling facility heat exchanger (54) evaporates the refrigerant, the second compressor (22) sucks in the refrigerant to compress the refrigerant again.

Heating and Cooling-Facility Heat Recovery Operation

Figure 8:
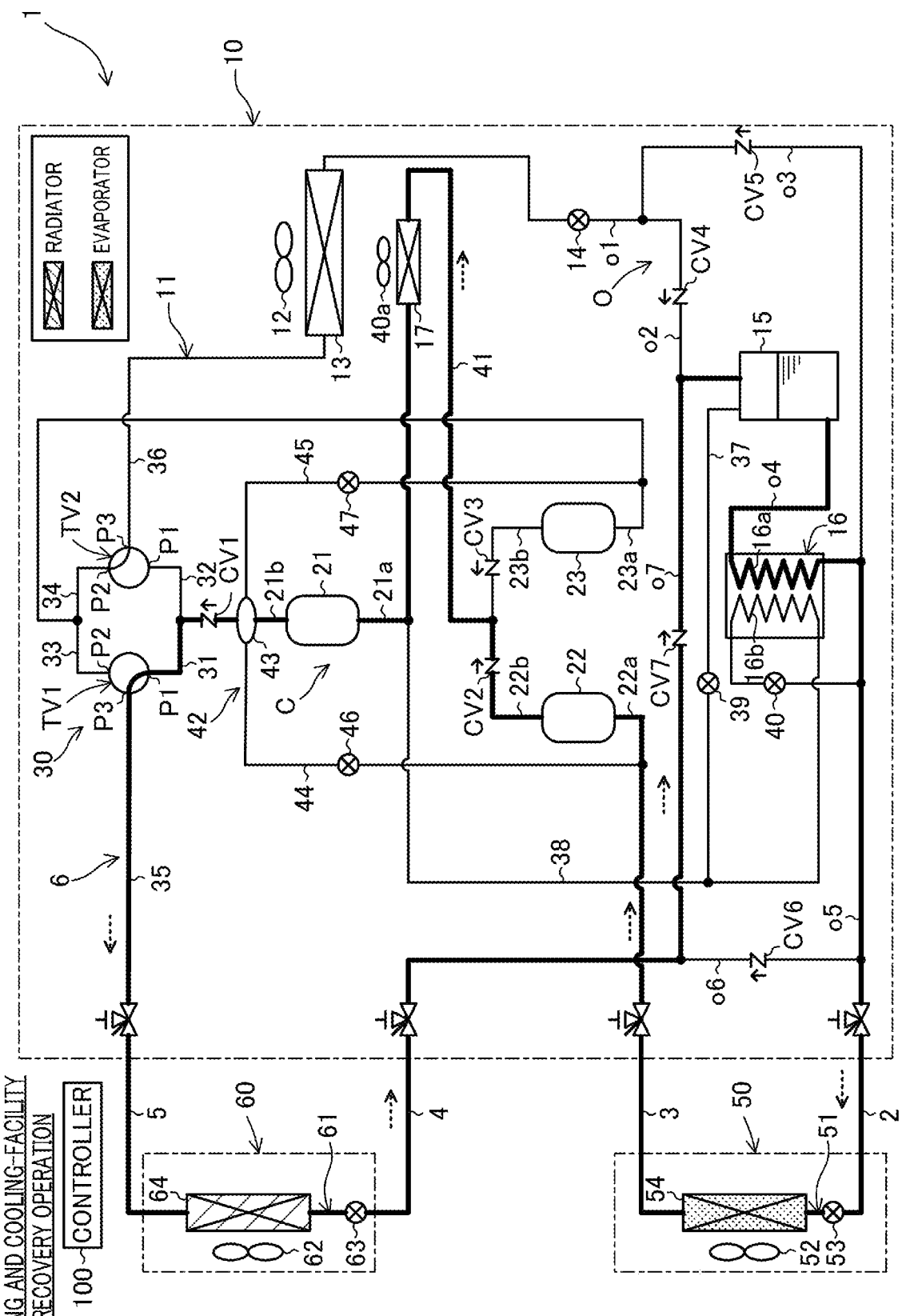
FIG. 8 is a diagram (equivalent to FIG. 1) of a flow of the refrigerant during a heating and cooling-facility heat recovery operation.

During the heating and cooling-facility heat recovery operation illustrated in FIG. 8, the first three-way valve (TV1) is in the first state, while the second three-way valve (TV2) is in the second state. The indoor expansion valve (63) is opened at a predetermined opening degree. The outdoor expansion valve (14) is fully closed. The opening degree of the cooling facility expansion valve (53) is adjusted by superheating control. The opening degree of the reducing valve (40) is appropriately adjusted. The indoor fan (62) and the inside fan (52) operate, while the outdoor fan (12) stops. The first compressor (21) and the second compressor (22) operate, while the third compressor (23) stops. During the heating and cooling-facility heat recovery operation, a refrigeration cycle is achieved, in which the compression unit (C) compresses the refrigerant, the indoor heat exchanger (64) causes the refrigerant to dissipate heat, the cooling facility heat exchanger (54) evaporates the refrigerant, and the outdoor heat exchanger (13) substantially stops.

As illustrated in FIG. 8, the second compressor (22) compresses the refrigerant, the intermediate cooler (17) cools the refrigerant, and the first compressor (21) sucks in the refrigerant. After the first compressor (21) compresses the refrigerant, the indoor heat exchanger (64) causes the refrigerant to dissipate heat. The indoor air is thus heated. After the indoor heat exchanger (64) causes the refrigerant to dissipate heat, the refrigerant flows through the receiver (15). The cooling heat exchanger (16) then cools the refrigerant. After the cooling heat exchanger (16) cools the refrigerant, the cooling facility expansion valve (53) decompresses the refrigerant, and the cooling facility heat exchanger (54) evaporates the refrigerant. After the cooling facility heat exchanger (54) evaporates the refrigerant, the second compressor (22) sucks in the refrigerant to compress the refrigerant again.

Heating and Cooling-Facility Waste Heat Operation

Figure 9:
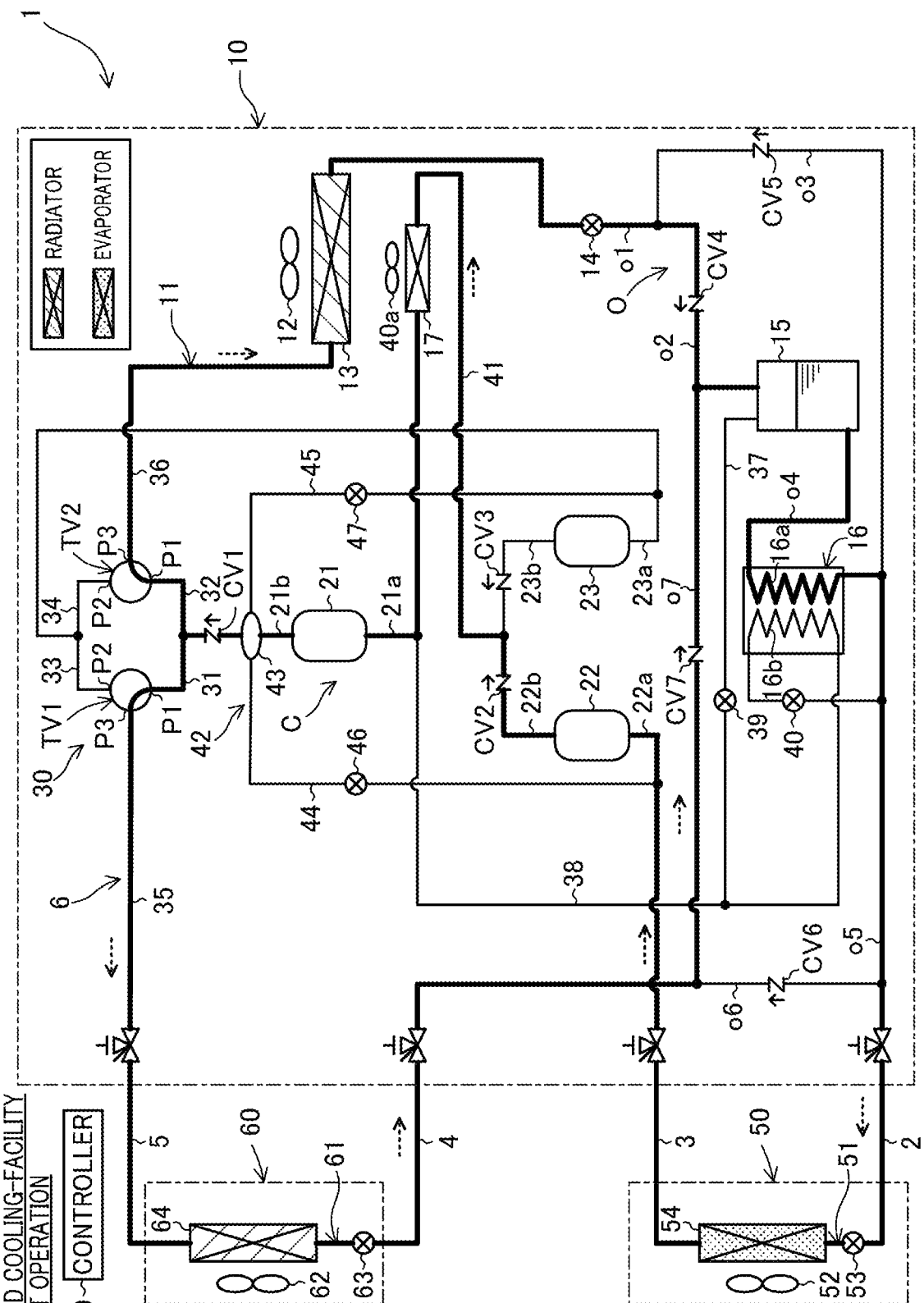
FIG. 9 is a diagram (equivalent to FIG. 1) of a flow of the refrigerant during a heating and cooling-facility waste heat operation.

During the heating and cooling-facility waste heat operation illustrated in FIG. 9, the first three-way valve (TV1) is in the first state, while the second three-way valve (TV2) is in the first state. Each of the indoor expansion valve (63) and the outdoor expansion valve (14) is opened at a predetermined opening degree. The opening degree of the cooling facility expansion valve (53) is adjusted by superheating control. The opening degree of the reducing valve (40) is appropriately adjusted. The outdoor fan (12), the inside fan (52), and the indoor fan (62) operate. The first compressor (21) and the second compressor (22) operate, while the third compressor (23) stops. During the heating and cooling-facility waste heat operation, a refrigeration cycle is achieved, in which the compression unit (C) compresses the refrigerant, each of the indoor heat exchanger (64) and the outdoor heat exchanger (13) causes the refrigerant to dissipate heat, and the cooling facility heat exchanger (54) evaporates the refrigerant.

As illustrated in FIG. 9, the second compressor (22) compresses the refrigerant, the intermediate cooler (17) cools the refrigerant, and the first compressor (21) sucks in the refrigerant. After the first compressor (21) compresses the refrigerant, the outdoor heat exchanger (13) causes a part of the refrigerant to dissipate heat. After the first compressor (21) compresses the refrigerant, the indoor heat exchanger (64) causes the remaining refrigerant to dissipate heat. The indoor air is thus heated. After the outdoor heat exchanger (13) causes the refrigerant to dissipate heat and the indoor heat exchanger (64) causes the refrigerant to dissipate heat, both the refrigerants flow into the receiver (15) in a merged state. The cooling heat exchanger (16) then cools the refrigerant. After the cooling heat exchanger (16) cools the refrigerant, the cooling facility expansion valve (53) decompresses the refrigerant, and the cooling facility heat exchanger (54) evaporates the refrigerant. The inside air is thus cooled. After the cooling facility heat exchanger (54) evaporates the refrigerant, the second compressor (22) sucks in the refrigerant to compress the refrigerant again.

Defrosting Operation

During the defrosting operation, the respective components operate in the same manners as those during the cooling operation illustrated in FIG. 4. During the defrosting operation, each of the second compressor (22) and the first compressor (21) compresses the refrigerant, and the outdoor heat exchanger (13) causes the refrigerant to dissipate heat. The heat inside the outdoor heat exchanger (13) thus melts frost on the surface of the outdoor heat exchanger (13). After the defrosting in the outdoor heat exchanger (13), the indoor heat exchanger (64) evaporates the refrigerant, and then the second compressor (22) sucks in the refrigerant to compress the refrigerant again.

Functional Effects of Switching Mechanism

In changing the operations described above, the refrigeration apparatus (1) appropriately switches the state of the switching unit (30). Specifically, the first three-way valve (TV1) is switched to the first state or the second state, while the second three-way valve (TV2) is switched to the first state or the second state.

According to a known pilot four-way switching valve, a spool valve is driven by means of a level differential pressure in the refrigerant circuit (6). The refrigerant circuit (6) according to the first embodiment achieves the refrigeration cycle (i.e., a super critical cycle) in which the compression unit (C) compresses the high-pressure refrigerant such that the pressure applied to the high-pressure refrigerant becomes equal to or more than a critical pressure. In the refrigerant circuit (6) according to the first embodiment, therefore, the use of the known pilot four-way switching valve excessively increases the level differential pressure acting on the spool valve to increase an impact in switching a state of the spool valve. This may result in damage to the four-way switching valve and a pipe to which the four-way switching valve is connected. This may also result in loud noise in switching a state of the four-way switching valve.

In view of this, the electrically driven three-way valve (TV1, TV2) serves as a switching mechanism in the first embodiment. As illustrated in FIG. 2, in switching the state of each of the first three-way valve (TV1) and the second three-way valve (TV2), the electric motor (74) drives the flow path switching portion (71). Each of the first three-way valve (TV1) and the second three-way valve (TV2) is thus switched to the first state or the second state. Therefore, the switching mechanism (TV1, TV2) according to the first embodiment causes no impact which may act on the spool valve due to the level differential pressure. This configuration thus causes no situation in which impulsive sound breaks the three-way valve (TV1, TV2) and its peripheral pipes and makes loud noise in the state switching of each three-way valve (TV1, TV2).

Control in State Switching

Each three-way valve (TV1, TV2), which is of an electrically driven type, applies a load to the electric motor (74) when the electric motor (74) drives the flow path switching portion (71). Specifically, the electric motor (74) produces a torque in driving the flow path switching portion (71) to rotate the flow path switching portion (71). At this time, the first port (P1) of each three-way valve (TV1, TV2) is connected to the high-pressure flow path, and the second port (P2) of each three-way valve (TV1, TV2) is connected to the low-pressure flow path. Consequently, if the level differential pressure in the refrigerant circuit (6) is large, the flow path switching portion (71) is pressed in a predetermined direction. This may result in an increase of the torque of the electric motor (74) and an increase of power consumption by the electric motor (74). In view of this, the first embodiment provides control for reducing the torque of the electric motor (74).

Figure 10:
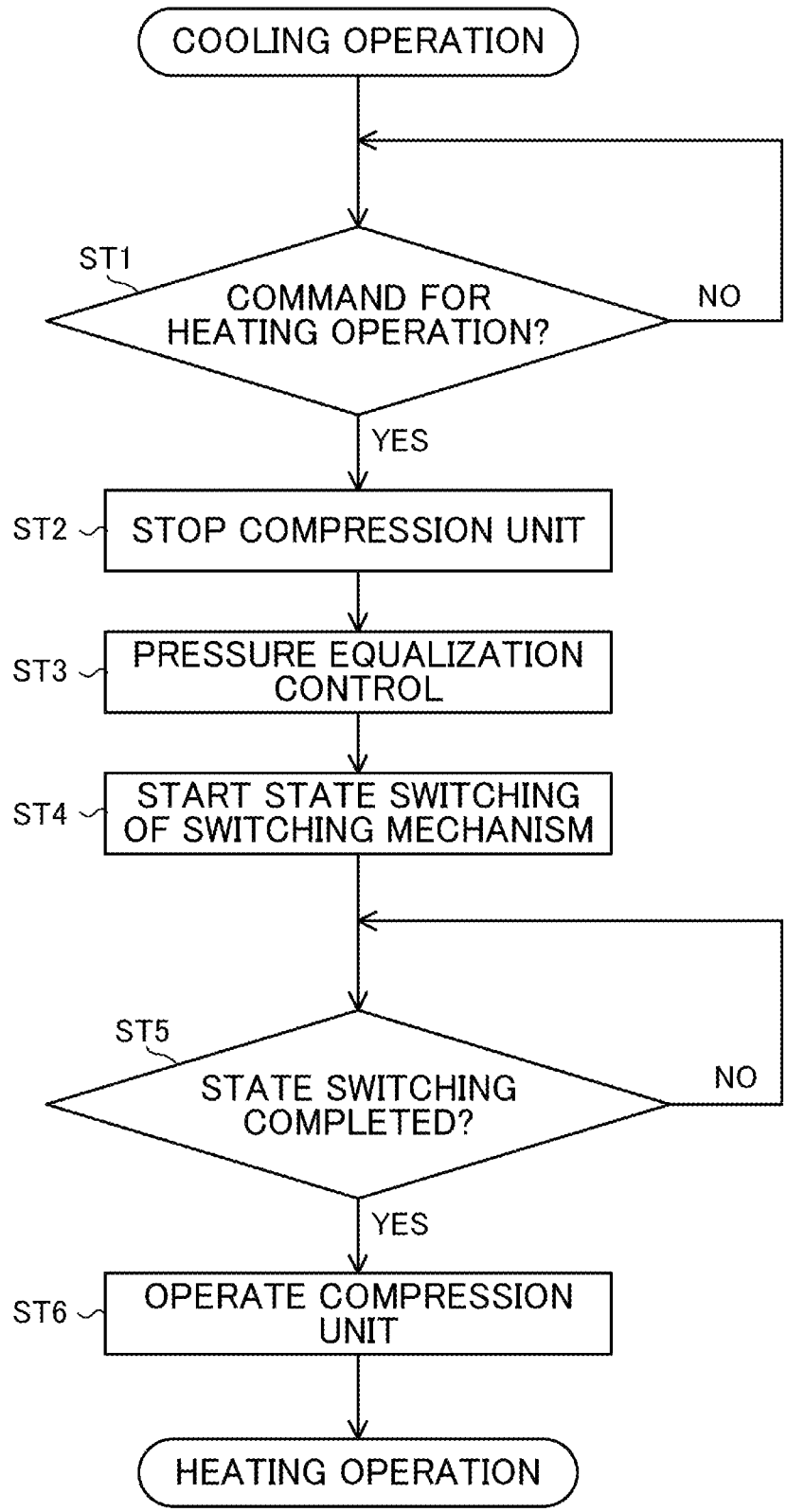
FIG. 10 is a flowchart of a change from the cooling operation to the heating operation.

As illustrated in FIG. 10, in the cooling operation (FIG. 4), the controller (100) receives a command for carrying out the heating operation (step ST1). Next, the controller (100) stops the first compressor (21) and the second compressor (22) (step ST2). This configuration thus enables a reduction in level differential pressure in the refrigerant circuit (6).

Next, the controller (100) performs control for equalizing the pressure in the high-pressure flow path of the refrigerant circuit (6) and the pressure in the low-pressure flow path of the refrigerant circuit (6) (step ST3). This pressure equalization control includes at least one of first control or second control to be described below. The first control involves increasing the opening degree of the indoor expansion valve (63) or fully opening the indoor expansion valve (63). The first control that involves increasing the opening degree of the indoor expansion valve (63) or fully opening the indoor expansion valve (63) decreases the pressure difference between the high-pressure flow path (including the first pipe (31) and the second pipe (32)) and the low-pressure flow path (including the third pipe (33) and the fourth pipe (34)) in the refrigerant circuit (6). The second control involves causing the high-pressure flow path to communicate with the low-pressure flow path. In the first embodiment, the second control is control that involves opening the second oil regulation valve (47) on the second oil return pipe (45). The second oil return pipe (45) has a first end communicating with the first discharge pipe (21b) and a second end connected to the third suction pipe (23a). Therefore, the second control that involves opening the second oil regulation valve (47) decreases the pressure difference between the high-pressure flow path and the low-pressure flow path. It should be noted that the controller (100) may concurrently perform the control for stopping the compression unit (C) in step ST2 and the pressure equalization control in step ST3.

As described above, according to the first embodiment, the indoor expansion valve (63) and the second oil regulation valve (47) constitute a pressure difference adjustment mechanism configured to decrease the pressure difference between the high-pressure flow path and the low-pressure flow path in the refrigerant circuit (6).

Next, the controller (100) starts state switching of the switching mechanism (step ST4). Specifically, the controller (100) controls the electric motor (74) of each three-way valve (TV1, TV2) such that the electric motor (74) drives the flow path switching portion (71) to rotate the flow path switching portion (71) (step ST4). At the start of the state switching, the level differential pressure in the refrigerant circuit (6) is decreased by the control in step ST2 and the control in S34. This configuration therefore enables a decrease in level differential pressure acting on each flow path switching portion (71) and a reduction in torque of each electric motor (74). This configuration thus enables a reduction in power consumption by each electric motor (74) in the state switching.

After completion of the state switching of each of the first three-way valve (TV1) and the second three-way valve (TV2) (step ST5), the controller (100) then operates the first compressor (21) and the second compressor (22) (step ST6). The refrigeration apparatus (1) thus carries out the heating operation.

The control illustrated in FIG. 10 is performed in switching between a first refrigeration cycle and a second refrigeration cycle in the state in which the cooling facility unit (50) stops. The first refrigeration cycle is a refrigeration cycle in which the heat source-side heat exchanger (the outdoor heat exchanger (13)) serves as a radiator and the utilization-side heat exchanger (the indoor heat exchanger (64)) serves as an evaporator. The second refrigeration cycle is a refrigeration cycle in which the utilization-side heat exchanger (the indoor heat exchanger (64)) serves as a radiator and the heat source-side heat exchanger (the outdoor heat exchanger (13)) serves as an evaporator. The control illustrated in FIG. 10 is therefore performed in changing from the heating operation to the cooling operation, changing from the heating operation to the defrosting operation, and changing from the defrosting operation to the heating operation.

In the first embodiment, the controller (100) stops the compression unit (C) before the start of the state switching of the switching mechanism (the three-way valve (TV1, TV2)). Alternatively, the controller (100) may stop the compression unit (C) in the state switching of the switching mechanism (the three-way valve (TV1, TV2)).

In changing from the heating operation to the cooling operation and changing from the heating operation to the defrosting operation, the controller (100) performs the pressure equalization control to increase the opening degree of the outdoor expansion valve (14) or fully open the outdoor expansion valve (14). The pressure equalization control that involves increasing the opening degree of the outdoor expansion valve (14) or fully opening the outdoor expansion valve (14) decreases the pressure difference between the high-pressure flow path and the low-pressure flow path. In this case, the outdoor expansion valve (14) constitutes a pressure difference adjustment mechanism configured to decrease a pressure difference between the high-pressure flow path and the low-pressure flow path.

In the first embodiment, the controller (100) performs the pressure equalization control before the start of the state switching of the switching mechanism (the three-way valve (TV1, TV2)). Alternatively, the controller (100) may perform the pressure equalization control in the state switching of the switching mechanism (the three-way valve (TV1, TV2)).

State Switching During Heating Operation

Figure 11:
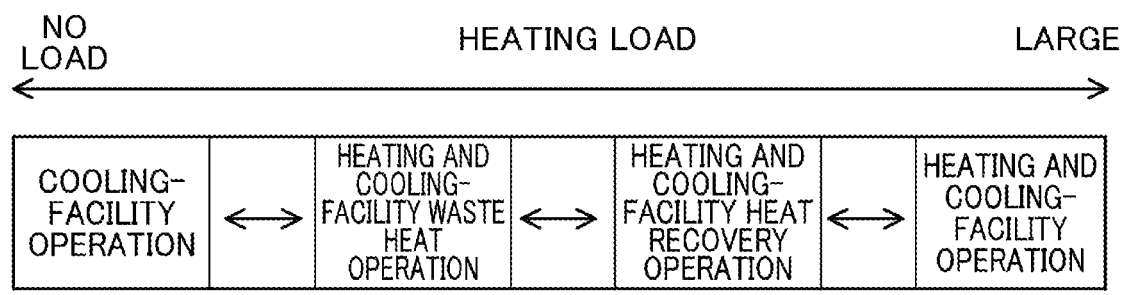
FIG. 11 is a table of operation changes according to a heating load.

As illustrated in FIG. 11, as a heating load increases in the cooling-facility operation, the controller (100) changes the operation to the heating and cooling-facility waste heat operation, the heating and cooling-facility heat recovery operation, and the heating and cooling-facility operation in sequence. On the contrary, as the heating load decreases, the controller (100) changes the operation to the heating and cooling-facility operation, the heating and cooling-facility heat recovery operation, the heating and cooling-facility waste heat operation, and the cooling-facility operation in sequence. During each of the four operations, the second compressor (22) operates so that the cooling facility unit (50) cools the inside air. In changing the operations, therefore, the controller (100) does not perform the control for stopping the first compressor (21) and the second compressor (22) (see step ST2 in FIG. 10) and the pressure equalization control. The reason therefor is because the control may degrade the cooling capacity of the cooling facility unit (50).

In changing the operations, the controller (100) controls the compression unit (C) so as to decrease the pressure difference between the high-pressure flow path and the low-pressure flow path in the compression unit (C) while operating the compression unit (C).

Specifically, it is assumed that, for example, the controller (100) receives a command for changing the operation from the cooling-facility operation (FIG. 3) to the heating and cooling-facility waste heat operation. In this case, the controller (100) reduces the operating frequency or the number of rotations of the first compressor (21) before a start of state switching of each three-way valve (TV1, TV2). At this time, preferably, the controller (100) minimizes the operating frequency of the first compressor (21). In other words, preferably, the controller (100) minimizes the number of rotations of the first compressor (21).

This configuration thus reduces the pressure in the high-pressure flow path, leading to a decrease in pressure difference between the high-pressure flow path and the low-pressure flow path. The controller (100) then performs the state switching of each of the first three-way valve (TV1) and the second three-way valve (TV2). The controller (100) then returns the operating frequency or the number of rotations of the first compressor (21) to a predetermined value according to the heating load. The controller (100) thus changes the operation from the cooling-facility operation to the heating and cooling-facility waste heat operation.

The foregoing control on the compression unit (C) is applicable to all the operation changes illustrated in FIG. 11. The controller (100) may reduce the operating frequency of the first compressor (21) in the state switching of the three-way valve (TV1, TV2). In addition, the controller (100) may reduce the operating frequency of the second compressor (22) or may reduce both the operating frequency of the first compressor (21) and the operating frequency of the second compressor (22) in order to decrease the pressure difference between the high-pressure flow path and the low-pressure flow path.

Advantageous Effects of First Embodiment

The first embodiment is directed to the refrigeration apparatus-use unit (the outdoor unit (60)) for the refrigeration apparatus (1) including the refrigerant circuit (6) configured to perform the refrigeration cycle in which a pressure above the critical pressure is applied to the refrigerant. The refrigeration apparatus-use unit includes the switching mechanism (TV1, TV2) configured to switch the flow path of the refrigerant in the refrigerant circuit (6). The switching mechanism (TV1, TV2) includes the electric motor (74), the flow path switching portion (71) to be driven by the electric motor (74), the first port (P1) connected to the high-pressure flow path (31, 32) of the refrigerant circuit (6), the second port (P2) connected to the low-pressure flow path (33, 34) of the refrigerant circuit (6), and the third port (P3) connected to a predetermined flow path of the refrigerant circuit (6). The switching mechanism (TV1, TV2) is switched between the first state in which the first port (P1) communicates with the third port (P3) and the second state in which the second port (P2) communicates with the third port (P3), in such a manner that the electric motor (74) drives the flow path switching portion (71).

With this configuration, in changing the operations described above, the electric motor (74) drives the flow path switching portion (71) to switch the flow path in the refrigerant circuit (6). This configuration therefore causes no situation in which a level differential pressure makes noise and breaks the switching mechanisms (TV1, TV2) and the pipes, even in the refrigerant circuit (6) that performs a super critical cycle.

According to the first embodiment, the controller (100) is configured to stop the compression unit (C) before the start of the state switching of the switching mechanism (TV1, TV2) or in the state switching.

This configuration enables a reduction in level differential pressure acting on each three-way valve (TV1, TV2) in switching between the first refrigeration cycle and the second refrigeration cycle. This configuration thus enables a reduction in torque of the electric motor (74) of each three-way valve (TV1, TV2). This configuration also enables a reduction in power consumption by the electric motor (74).

According to the first embodiment, the pressure difference adjustment mechanism (14, 47, 63) is configured to decrease the pressure difference between the high-pressure flow path (31, 32) and the low-pressure flow path (33, 34) before the start of the state switching of the switching mechanism (TV1, TV2) or in the state switching.

This configuration reliably enables a decrease in pressure difference between the high-pressure flow path and the low-pressure flow path in the state switching of the switching mechanism (TV1, TV2). This configuration thus enables a reduction in torque of the electric motor (74) of each three-way valve (TV1, TV2). This configuration also enables a reduction in power consumption by the electric motor (74).

According to the first embodiment, the controller (100) is configured to control the compression unit (C) to decrease the pressure difference between the high-pressure flow path (31, 32) and the low-pressure flow path (33, 34) before the start of the state switching of the switching mechanism (TV1, TV2) or in the state switching.

This configuration enables a decrease in pressure difference between the high-pressure flow path and the low-pressure flow path without a stop of the compression unit (C) in changing the operations illustrated in FIG. 11. This configuration thus enables a reduction in torque of the electric motor (74) of each three-way valve (TV1, TV2) and also enables a reduction in power consumption by the electric motor (74), in changing the heating operations illustrated in FIG. 11. The heating operations are continuously carried out without a temporary stop.

According to the first embodiment, the compression unit (C) is of a two-stage compression type. This configuration therefore increases the level differential pressure in the refrigerant circuit (6). However, this configuration reliably enables a reduction in torque of the electric motor (74), in such a manner that the pressure difference between the high-pressure flow path and the low-pressure flow path is decreased as described above.

According to the first embodiment, the controller (100) reduces the operating frequency of the first compressor (21), of the first compressor (21) and the second compressor (22) connected in series. This configuration therefore suppresses degradation in cooling capacity of the cooling facility unit (50) owing to a reduction in operating frequency of the second compressor (22). This configuration thus suppresses an increase in temperature of the air in the cooling facility unit (50) in changing the operations illustrated in FIG. 11.

Second Embodiment

Figure 12:
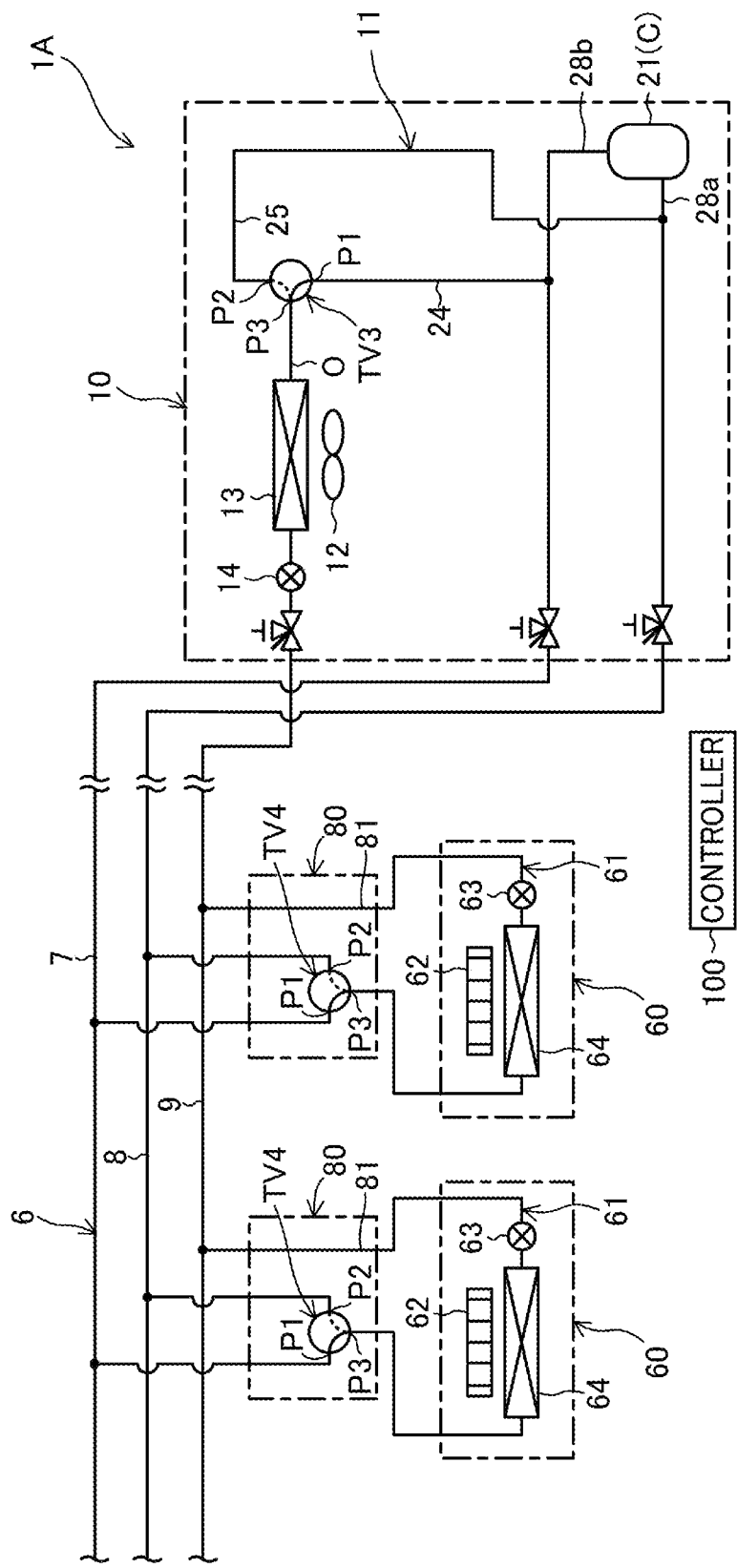
FIG. 12 is a diagram of a piping system in a refrigeration apparatus (an air conditioning apparatus) according to a second embodiment.

An air conditioning apparatus (1A) illustrated in FIG. 12 is a refrigeration apparatus according to a second embodiment. The air conditioning apparatus (1A) includes an outdoor unit (10), a plurality of indoor units (60), and a plurality of intermediate units (80) for the respective indoor units (60). The air conditioning apparatus (1A) according to the second embodiment allows one indoor unit (60) to heat indoor air and allows another indoor unit (60) to cool indoor air at the same time. In other words, the air conditioning apparatus (1A) according to the second embodiment is configured to carry out a simultaneous cooling and heating operation. In FIG. 12, the air conditioning apparatus (1A) includes two indoor units (60) and two intermediate units (80); however, the number is merely an example. The air conditioning apparatus (1A) may include three or more indoor units (60) and three or more intermediate units (80). Specifically, the air conditioning apparatus (1A) according to the second embodiment includes a first indoor unit (60A) and a first intermediate unit (80A) for the first indoor unit (60A). Specifically, the air conditioning apparatus (1A) according to the second embodiment includes a second indoor unit (60B) and a second intermediate unit (80B) for the second indoor unit (60B).

In the air conditioning apparatus (1A), the outdoor unit (10) is connected to the indoor units (60) via three connection pipes (7, 8, 9) and the intermediate units (80). A refrigerant circuit (6) is thus constituted. The refrigerant circuit (6) is configured to perform a refrigeration cycle in which a pressure above a critical pressure is applied to a refrigerant. The three connection pipes include a high-pressure connection pipe (7), a low-pressure connection pipe (8), and a relay connection pipe (9).

Outdoor Unit

The outdoor unit (10) is a heat source unit including an outdoor fan (12) and an outdoor circuit (11). The outdoor circuit (11) includes one compressor (28) (a compression unit (C)), an outdoor heat exchanger (13), an outdoor expansion valve (14), and a third three-way valve (TV3). Alternatively, the outdoor circuit (11) may include two or more outdoor heat exchangers. The outdoor unit (10) is a refrigeration apparatus-use unit including a switching mechanism (TV3).

The third three-way valve (TV3) is an electrically driven rotary-type three-way valve, which is similar to that described in the first embodiment. The third three-way valve (TV3) has a first port (P1), a second port (P2), and a third port (P3). The first port (P1) of the third three-way valve (TV3) is connected to a first end of a high-pressure pipe (24) serving as a high-pressure flow path. The high-pressure pipe (24) has a second end connected to a discharge pipe (28b) of the compressor (28). The second port (P2) of the third three-way valve (TV3) is connected to a first end of a low-pressure pipe (25) serving as a low-pressure flow path. The low-pressure pipe (25) has a second end connected to a suction pipe (28a) of the compressor (28). The third port (P3) of the third three-way valve (TV3) is connected to a first end of an outdoor flow path (O). The outdoor flow path (O) has a second end connected to the high-pressure connection pipe (7). The outdoor heat exchanger (13) and the outdoor expansion valve (14) are connected to the outdoor flow path (O) in this order from a gas side toward a liquid side. The discharge pipe (28b) communicates with the high-pressure connection pipe (7). The suction pipe (28a) communicates with the low-pressure connection pipe (8).

The third three-way valve (TV3) is switched between a first state (a state indicated by a solid line in FIG. 12) and a second state (a state indicated by a broken line in FIG. 12). In the third three-way valve (TV3) switched to the first state, the first port (P1) and the third port (P3) communicate with each other and the second port (P2) is closed. In the third three-way valve (TV) switched to the second state, the second port (P2) and the third port (P3) communicate with each other and the first port (P1) is closed.

Indoor Unit

Each of the indoor units (60) includes an indoor fan (62) and an indoor circuit (61). The indoor circuit (61) includes an indoor expansion valve (63) and an indoor heat exchanger (64) arranged in this order from the liquid end toward the gas end.

Intermediate Unit

Each of the intermediate units (80) is a refrigeration apparatus-use unit including a switching mechanism (TV4). The intermediate units (80) are interposed between the three connection pipes (7, 8, 9) and the indoor units (60). The intermediate units (80) each include a fourth three-way valve (TV4) and a relay pipe (81).

The fourth three-way valve (TV4) is an electrically driven rotary-type three-way valve, which is similar to that described in the first embodiment. The fourth three-way valve (TV4) has a first port (P1), a second port (P2), and a third port (P3). The first port (P1) of the fourth three-way valve (TV4) is connected to the high-pressure connection pipe (7) serving as a high-pressure flow path. The second port (P2) of the fourth three-way valve (TV4) is connected to the low-pressure connection pipe (8) serving as a low-pressure flow path. The third port (P3) of the third three-way valve (TV3) is connected to a gas end of the indoor circuit (61). The relay pipe (81) has a first end connected to the relay connection pipe (9). The relay pipe (81) has a second end connected to a liquid end of the indoor circuit (61).

Operations

Next, a description will be given of operations to be carried out by the air conditioning apparatus (1A) according to the second embodiment. The air conditioning apparatus (1A) carries out a cooling operation, a heating operation, and a simultaneous cooling and heating operation while changing the operations.

Cooling Operation

Figure 13:
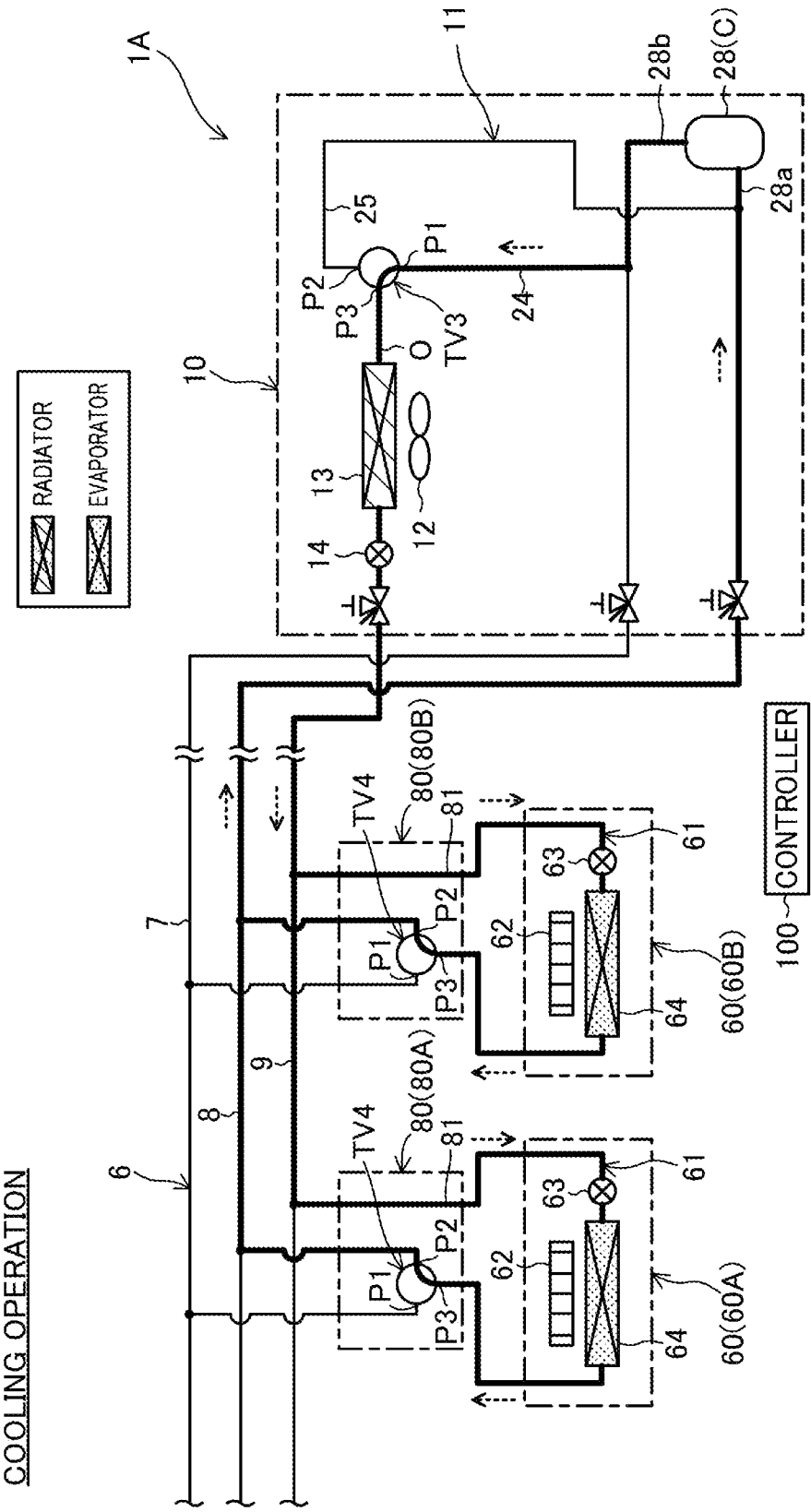
FIG. 13 is a diagram (equivalent to FIG. 12) of a flow of a refrigerant during a cooling operation.

During the cooling operation illustrated in FIG. 13, the first indoor unit (60A) cools the indoor air and the second indoor unit (60B) cools the indoor air. During the cooling operation, the third three-way valve (TV3) is in the first state, the fourth three-way valve (TV4) of the first intermediate unit (80A) is in the second state, and the fourth three-way valve (TV4) of the second intermediate unit (80B) is in the second state. The outdoor expansion valve (14) is opened at a predetermined opening degree, and the opening degree of the indoor expansion valve (63) of each indoor unit (60) is adjusted by superheating control. The compressor (28), the outdoor fan (12), and each indoor fan (62) operate.

As illustrated in FIG. 13, the compressor (28) compresses the refrigerant, and the outdoor heat exchanger (13) causes the refrigerant to dissipate heat. The refrigerant flows through the relay connection pipe (9), and then is diverted into the relay pipes (81). The diverted refrigerants then flow into the first indoor unit (60A) and the second indoor unit (60B). In the first indoor unit (60A), the indoor expansion valve (63) decompresses the refrigerant, and the indoor heat exchanger (64) evaporates the refrigerant. The indoor air is thus cooled. In the second indoor unit (60B), the indoor expansion valve (63) decompresses the refrigerant, and the indoor heat exchanger (64) evaporates the refrigerant. The indoor air is thus cooled.

The refrigerants evaporated in the respective indoor units (60) flow into the low-pressure connection pipe (8) in a merged state. The compressor (28) then sucks in the refrigerant to compress the refrigerant again.

Heating Operation

Figure 14:
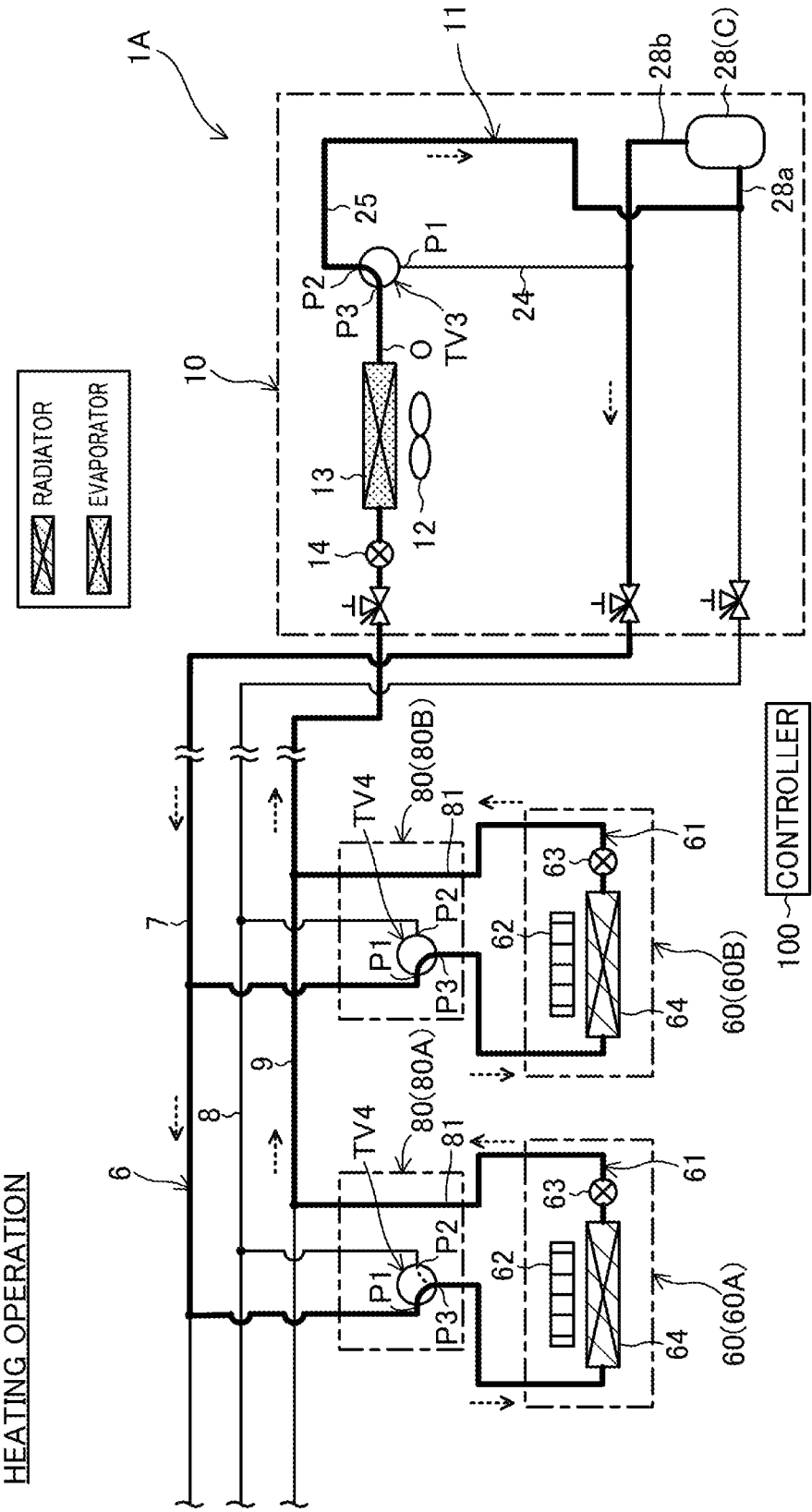
FIG. 14 is a diagram (equivalent to FIG. 12) of a flow of the refrigerant during a heating operation.

During the heating operation illustrated in FIG. 14, the first indoor unit (60A) heats the indoor air and the second indoor unit (60B) heats the indoor air. During the heating operation, the third three-way valve (TV3) is in the second state, the fourth three-way valve (TV4) of the first intermediate unit (80A) is in the first state, and the fourth three-way valve (TV4) of the second intermediate unit (80B) is in the first state. Each indoor expansion valve (63) is opened at a predetermined opening degree, and the opening degree of the outdoor expansion valve (14) is adjusted by superheating control. The compressor (28), the outdoor fan (12), and each indoor fan (62) operate.

As illustrated in FIG. 14, the compressor (28) compresses the refrigerant. The refrigerant flows into the high-pressure connection pipe (7) and then is diverted into the intermediate units (80). The diverted refrigerants flow into the first indoor unit (60A) and the second indoor unit (60B). In the first indoor unit (60A), the indoor heat exchanger (64) causes the refrigerant to dissipate heat. The indoor air is thus heated. In the second indoor unit (60B), the indoor heat exchanger (64)

causes the refrigerant to dissipate heat. The indoor air is thus heated. After the indoor heat exchangers (64) heat the refrigerants, the heated refrigerants flow into the relay connection pipe (9) in a merged state. The outdoor expansion valve (14) then decompresses the refrigerant. After the outdoor expansion valve (14) decompresses the refrigerant, the compressor (28) sucks in the refrigerant to compress the refrigerant again.

Simultaneous Cooling and Heating Operation

Figure 15:
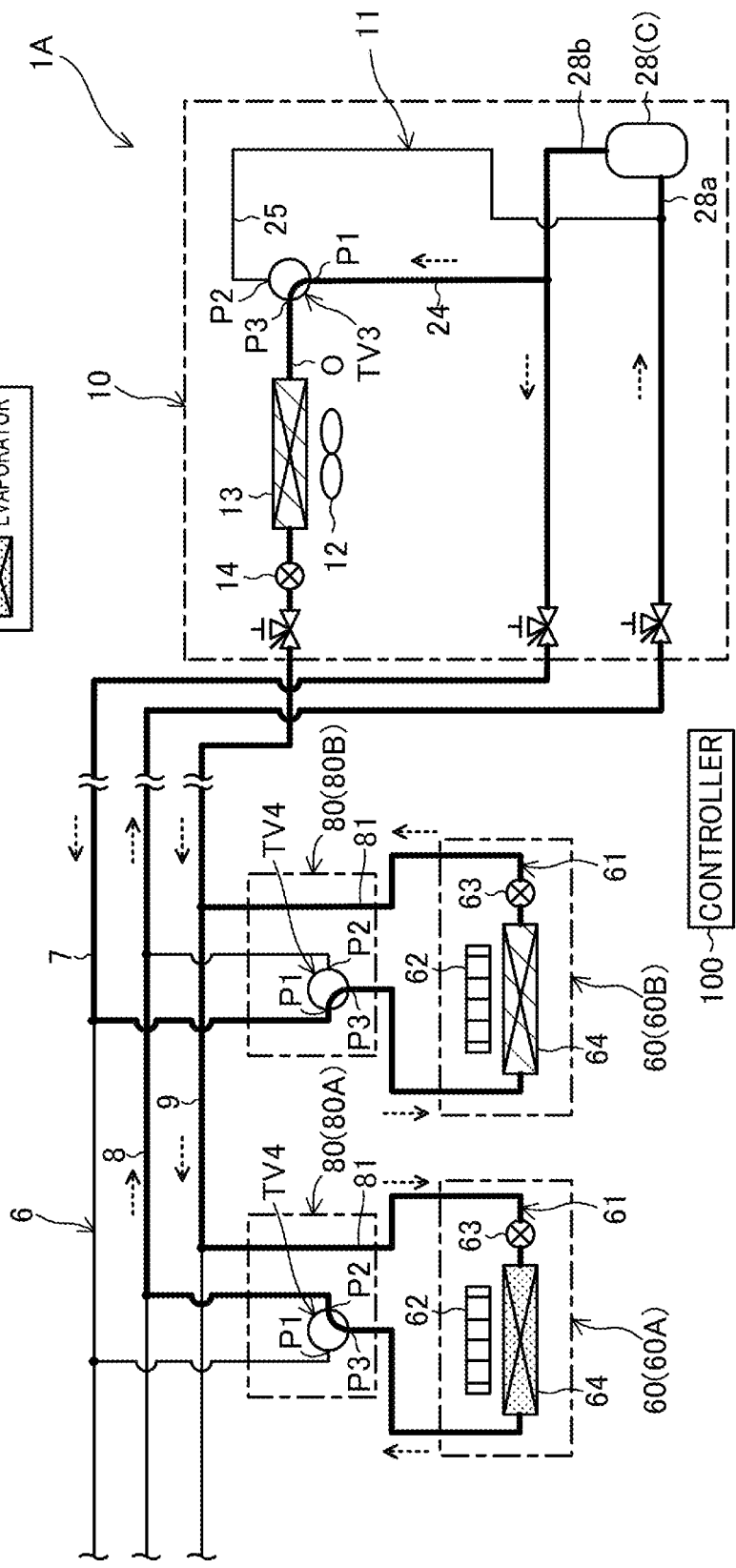
FIG. 15 is a diagram (equivalent to FIG. 12) of a flow of the refrigerant during a simultaneous cooling and heating operation.

During the simultaneous cooling and heating operation illustrated in FIG. 15, for example, the first indoor unit (60A) cools the indoor air and the second indoor unit (60B) heats the indoor air at the same time. Although not described in detail, the second indoor unit (60B) may cool the indoor air and the first indoor unit (60A) may heat the indoor air.

During the cooling and heating operation according to the second embodiment, the third three-way valve (TV3) is in the first state, the fourth three-way valve (TV4) of the first intermediate unit (80A) is in the second state, and the fourth three-way valve (TV4) of the second intermediate unit (80B) is in the first state. The opening degree of the indoor expansion valve (63) of the first indoor unit (60A) is adjusted by superheating control, and each of the indoor expansion valve (63) of the second indoor unit (60B) and the outdoor expansion valve (14) is opened at a predetermined opening degree. The compressor (28), the outdoor fan (12), and each indoor fan (62) operate.

As illustrated in FIG. 15, the compressor (28) compresses the refrigerant, and the outdoor heat exchanger (13) causes a part of the refrigerant to dissipate heat. The remaining refrigerant flows into the high-pressure connection pipe (7). When the refrigerant flows through the high-pressure connection pipe (7), then the refrigerant flows into the second indoor unit (60B) via the second intermediate unit (80B). In the second indoor unit (60B), the indoor heat exchanger (64) causes the refrigerant to dissipate heat. The indoor air is thus heated. After the second indoor unit (60B) causes the refrigerant to dissipate heat and the outdoor heat exchanger (13) causes the refrigerant to dissipate heat, both the refrigerants flow into the relay connection pipe (9) in a merged state. When the refrigerant flows through the relay connection pipe (9), then the refrigerant flows into the first indoor unit (60A) via the first intermediate unit (80A). In the first indoor unit (60A), the indoor expansion valve (63) decompresses the refrigerant, and the indoor heat exchanger (64) evaporates the refrigerant. The indoor air is thus cooled. The refrigerants evaporated in the respective indoor units (60) flow into the low-pressure connection pipe (8). The compressor (28) then sucks in the refrigerant to compress the refrigerant again.

Functional Effects of Switching Mechanism

In the second embodiment, the third three-way valve (TV3) and the fourth three-way valve (TV4) each constitute a switching mechanism. Each of the third three-way valve (TV3) and the fourth three-way valve (TV4) is an electrically driven three-way valve to be driven by an electric motor (74), as in the first embodiment. This configuration therefore causes no situation in which a level differential pressure makes loud noise and breaks valves or pipes in each of the operations described above.

Control in State Switching

The second embodiment is similar to the first embodiment in control to be performed in changing the operations. A controller (100) stops the compressor (28) in accordance with a command for changing from a certain operation to a different operation. Next, the controller (100) performs pressure equalization control to decrease a pressure difference between the high-pressure flow path (including the high-pressure pipe (24) and the high-pressure connection pipe (7)) and the low-pressure flow path (including the low-pressure pipe (25) and the low-pressure connection pipe (8)). Specifically, in changing from the cooling operation to the heating operation and changing from the cooling operation to the simultaneous cooling and heating operation, the controller (100) performs the pressure equalization control to increase the opening degree of each indoor expansion valve (63) or fully open each indoor expansion valve (63). In changing from the heating operation to the cooling operation and changing from the heating operation to the simultaneous cooling and heating operation, the controller (100) performs the pressure equalization control to increase the opening degree of the outdoor expansion valve (14) or fully open the outdoor expansion valve (14). In changing from the simultaneous cooling and heating operation to the cooling operation and changing from the simultaneous cooling and heating operation to the heating operation, the controller (100) performs the pressure equalization control to increase the opening degree of the indoor expansion valve (63) of the indoor unit (60) which has cooled the indoor air or fully open the indoor expansion valve (63). In the second embodiment, as described above, the indoor expansion valves (63) and the outdoor expansion valve (14) each constitute a pressure difference adjustment mechanism.

After the control for stopping the compressor (28) and the pressure equalization control, the controller (100) performs state switching of each of the third three-way valve (TV3) and the fourth three-way valves (TV4). This configuration therefore enables a reduction in level differential pressure in the state switching of each of the third three-way valve (TV3) and the fourth three-way valves (TV4). This configuration also enables a reduction in torque of the electric motors (74).

The controller (100) may perform the control for stopping the compressor (28) and the pressure equalization control in the state switching of each of the third three-way valve (TV3) and the fourth three-way valves (TV4). In addition, the controller (100) may reduce the operating frequency of the compressor (28) or may minimize the operating frequency before a start of the state switching of each of the third three-way valve (TV3) and the fourth three-way valves (TV4) or in the state switching.

Third Embodiment

Figure 16:
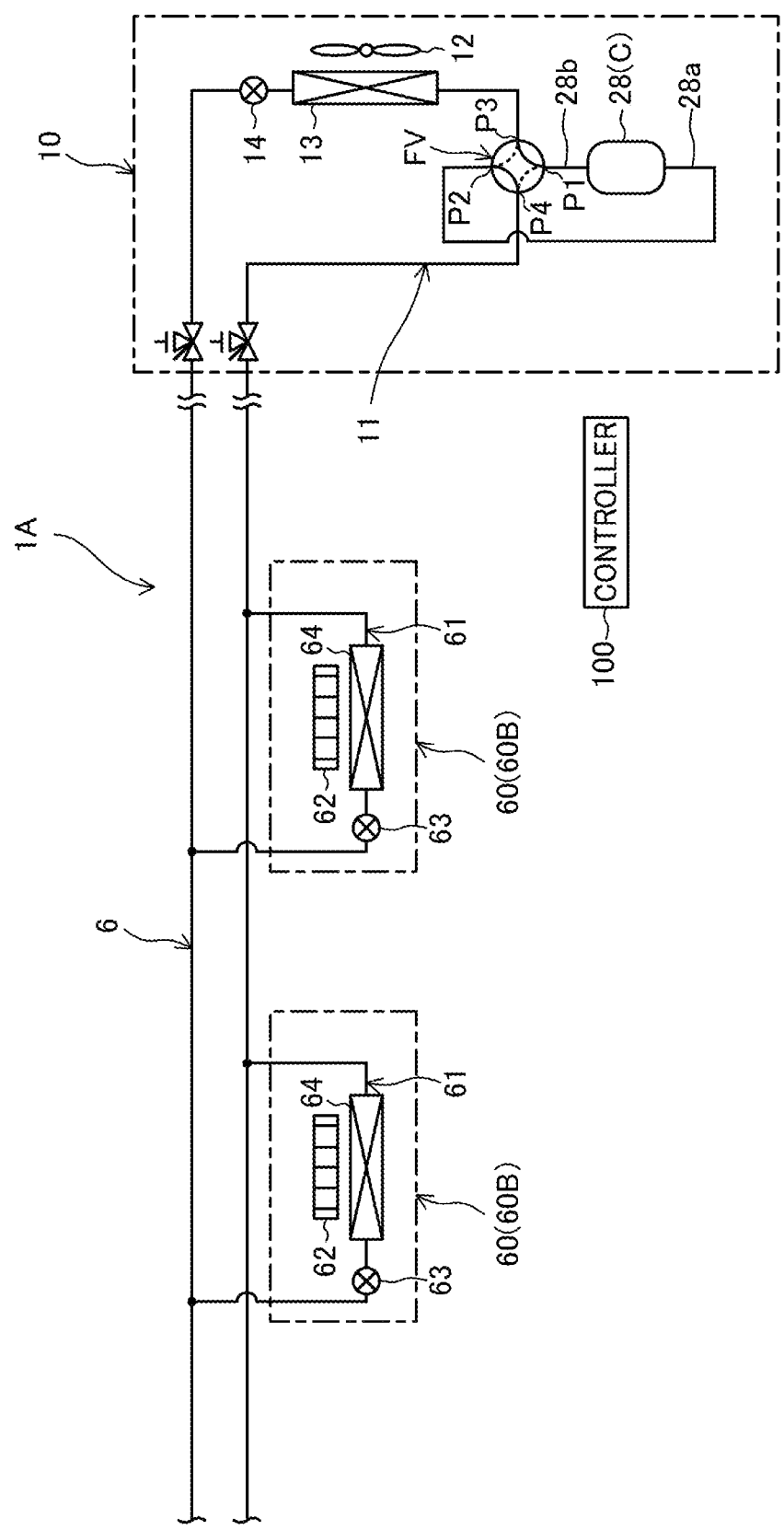
FIG. 16 is a diagram of a piping system in a refrigeration apparatus (an air conditioning apparatus) according to a third embodiment.

An air conditioning apparatus (1A) illustrated in FIG. 16 is a refrigeration apparatus according to a third embodiment. The air conditioning apparatus (1A) includes an outdoor unit (10) serving as a heat source unit, and a plurality of indoor units (60) each serving as a utilization unit. The air conditioning apparatus (1A) carries out a cooling operation and a heating operation while changing the operations. The third embodiment is similar to the first embodiment and the second embodiment in that a refrigerant circuit (6) performs a refrigeration cycle in which a pressure above a critical pressure is applied to carbon dioxide.

As illustrated in FIG. 16, the outdoor unit (10) according to the third embodiment includes an outdoor circuit (11) including an electrically driven four-way valve (FV). The outdoor unit (10) is a refrigeration apparatus-use unit including the four-way valve (FV) serving as a switching mechanism. The third embodiment is similar to the first embodiment and the second embodiment in that the four-way valve (FV) includes an electric motor (74) and a flow path switching portion (71) to be driven by the electric motor (74). The four-way valve (FV) has a first port (P1), a second port (P2), a third port (P3), and a fourth port (P4). The first port (P1) is connected to a discharge pipe (28b) serving as a high-pressure flow path. The second port (P2) is connected to a suction pipe (28a) serving as a low-pressure flow path. The third port (P3) is connected to a flow path to which an outdoor heat exchanger (13) is connected. The fourth port (P4) is connected to a flow path to which indoor units (60) are connected.

The four-way valve (FV) is switched between a first state (a state indicated by a solid line in FIG. 16) and a second state (a state indicated by a broken line in FIG. 16) in such a manner that the electric motor (74) drives the flow path switching portion (71) to rotate the flow path switching portion (71). In the four-way valve (FV) switched to the first state, the first port (P1) communicates with the third port (P3) and the second port (P2) communicates with the fourth port (P4). In the four-way valve (FV) switched to the second state, the second port (P2) communicates with the third port (P3) and the first port (P1) communicates with the fourth port (P4).

During the cooling operation according to the third embodiment, the four-way valve (FV) is in the first state. An outdoor expansion valve (14) is opened at a predetermined opening degree, and the opening degree of each indoor expansion valve (63) is adjusted by superheating control. A compressor (28), an outdoor fan (12), and each indoor fan (62) operate. During the cooling operation, a first refrigeration cycle is achieved, in which the outdoor heat exchanger (13) serves as a radiator and each indoor heat exchanger (64) serves as an evaporator.

During the heating operation according to the third embodiment, the four-way valve (FV) is in the second state. Each indoor expansion valve (63) is opened at a predetermined opening degree, and the opening degree of the outdoor expansion valve (14) is adjusted by superheating control. The compressor (28), the outdoor fan (12), and each indoor fan (62) operate. During the heating operation, a second refrigeration cycle is achieved, in which each indoor heat exchanger (64) serves as a radiator and the outdoor heat exchanger (13) serves as an evaporator.

In the third embodiment, the four-way valve (FV) is of an electrically driven type. This configuration therefore reduces noise in changing the cooling operation and the heating operation and suppresses damage to valves and pipes in changing the cooling operation and the heating operation.

In changing from the cooling operation to the heating operation, a controller (100) stops the compressor (28) before a start of state switching of the four-way valve (FV) or in the state switching. In addition, in changing from the cooling operation to the heating operation, the controller (100) increases the opening degree of each indoor expansion valve (63) serving as a pressure difference adjustment mechanism or fully opens each indoor expansion valve (63) before the start of the state switching of the four-way valve (FV) or in the state switching. This configuration thus enables a reduction in torque of the electric motor (74) of the four-way valve (FV).

In changing from the heating operation to the cooling operation, the controller (100) stops the compressor (28) before the start of the state switching of the four-way valve (FV) or in the state switching. In addition, in changing from the heating operation to the cooling operation, the controller (100) increases the opening degree of the outdoor expansion valve (14) serving as a pressure difference adjustment mechanism or fully opens the outdoor expansion valve (14) before the start of the state switching of the four-way valve (FV) or in the state switching. This configuration thus enables a reduction in torque of the electric motor (74) of the four-way valve (FV).

In the third embodiment, the controller (100) may perform pressure equalization control by addition of a pipe through which the discharge pipe (28b) communicates with the suction pipe (28a). Also in the third embodiment, the controller (100) may reduce the operating frequency of the compressor (28) or may minimize the operating frequency before the start of the state switching of the four-way valve (FV) or in the state switching.

Other Embodiments

The foregoing embodiments may be modified as below.

The compression unit (C) may be a multistage compressor that includes a motor, one drive shaft coupled to the motor, and two or more compression mechanisms each coupled to the drive shaft. In this configuration, the controller (100) may stop the multistage compressor or may reduce the operating frequency of the multistage compressor (i.e., the number of rotations of the drive shaft) before the start of the state switching of the switching mechanism or in the state switching.

The utilization-side heat exchanger is not necessarily an air heat exchanger. For example, the indoor heat exchanger (64) according to the first embodiment may be a heat exchanger configured to perform heat exchange with water or any heat medium. In this configuration, the heat exchanger serves as an evaporator to cool water or any heat medium. Alternatively, the heat exchanger serves as a radiator to heat water or any heat medium.

The switching mechanism is not necessarily of a rotary type as long as it is of an electrically driven type. For example, the switching mechanism may be configured to drive the flow path switching portion (71) while converting rotational motion of the electric motor (74) into linear motion and to switch the communicating state of each port.

While the embodiments and modifications have been described herein above, it is to be appreciated that various changes in form and detail may be made without departing from the spirit and scope presently or hereafter claimed. In addition, the foregoing embodiments and modifications may be appropriately combined or substituted as long as the combination or substitution does not impair the functions of the present disclosure. The foregoing ordinal numbers such as "first", "second", and "third" are merely used for distinguishing the elements designated with the ordinal numbers, and are not intended to limit the number and order of the elements.

INDUSTRIAL APPLICABILITY

As described above, the present disclosure is applicable to a refrigeration apparatus-use unit, a heat source unit, and a refrigeration apparatus.

REFERENCE SIGNS LIST

1: refrigeration apparatus
1A: air conditioning apparatus (refrigeration apparatus)
7: high-pressure connection pipe (high-pressure flow path)

8: low-pressure connection pipe (low-pressure flow path)
10: outdoor unit (heat source unit, refrigeration apparatus-use unit)
11: refrigerant circuit
13: heat source-side heat exchanger
14: outdoor expansion valve (pressure difference adjustment mechanism)
21: first compressor (compression unit)
22: second compressor (compression unit)
23: third compressor (compression unit)
24: high-pressure pipe (high-pressure flow path)
25: low-pressure pipe (low-pressure flow path)
28a: suction pipe (low-pressure flow path)
28b: high-pressure pipe (high-pressure flow path)
31: first pipe (high-pressure flow path)
32: second pipe (high-pressure flow path)
33: third pipe (low-pressure flow path)
34: fourth pipe (low-pressure flow path)
64: indoor heat exchanger (utilization-side heat exchanger)
71: flow path switching portion
74: electric motor
80: intermediate unit (refrigeration apparatus unit)
100: controller (control unit)
TV1: first three-way valve (switching mechanism)
TV2: second three-way valve (switching mechanism)
TV3: third three-way valve (switching mechanism)
TV4: fourth three-way valve (switching mechanism)
FV: four-way valve
P1: first port
P2: second port
P3: third port
P4: fourth port

The invention claimed is:

1. A refrigeration apparatus-use unit for a refrigeration apparatus including a refrigerant circuit configured to perform a refrigeration cycle in which a pressure above a critical pressure is applied to a refrigerant,
the refrigeration apparatus-use unit comprising
a switching mechanism configured to switch a flow path of the refrigerant in the refrigerant circuit,
wherein
the switching mechanism includes:
an electric motor;
a flow path switching portion to be driven by the electric motor;
a first port connected to a high-pressure flow path of the refrigerant circuit;
a second port connected to a low-pressure flow path of the refrigerant circuit; and
a third port connected to a predetermined flow path of the refrigerant circuit,
the switching mechanism is switched to a first state in which the first port communicates with the third port or a second state in which the second port communicates with the third port in such a manner that the electric motor drives the flow path switching portion,
the switching mechanism comprises an electrically driven three-way valve,
the three-way valve comprises a first three-way valve and a second three-way valve,
the first port of the first three-way valve is connected to a discharge side of a compression unit,
the second port of the first three-way valve is connected to a suction side of the compression unit,
the third port of the first three-way valve is connected to a gas end of a utilization-side heat exchanger,
the first port of the second three-way valve is connected to the discharge side of the compression unit,
the second port of the second three-way valve is connected to the suction side of the compression unit,
the third port of the second three-way valve is connected to a gas end of a heat source-side heat exchanger,
the compression unit includes a cooling facility-side compressor and an indoor-side compressor, which are in parallel to each other,
a suction side of the cooling facility-side compressor is connected to a gas end of a cooling facility heat exchanger, and
a suction side of the indoor-side compressor is connected to both the second port of the first three-way valve and the second port of the second three-way valve.

2. The refrigeration apparatus-use unit according to claim 1, wherein
the switching mechanism comprises a rotary-type flow path switching valve, and the electric motor drives the flow path switching portion to rotate the flow path switching portion.

3. The refrigeration apparatus-use unit according to claim 1, wherein
the refrigerant in the refrigerant circuit comprises carbon dioxide.

4. A heat source unit for a refrigeration apparatus including a refrigerant circuit configured to perform a refrigeration cycle in which a pressure above a critical pressure is applied to a refrigerant,
the heat source unit comprising:
the refrigeration apparatus-use unit according to claim 1;
the compression unit; and
the heat source-side heat exchanger.

5. The heat source unit according to claim 4, further comprising:
a control unitconfigured to stop the compression unit before a start of state switching of the switching mechanism or in the state switching.

6. The heat source unit according to claim 4, further comprising:
a control unit configured to control the compression unit to decrease a pressure difference between the high-pressure flow path and the low-pressure flow path before a start of state switching of the switching mechanism or in the state switching.

7. The heat source unit according to claim 6, wherein
the control unit decreases an operating frequency of the cooling facility-side compressor before the start of the state switching of the switching mechanism or in the state switching.

8. The heat source unit according to claim 6, wherein
the control unit decreases an operating frequency of at least one of the indoor-side compressor or the cooling facility-side compressor before the start of the state switching of the switching mechanism or in the state switching.

9. The heat source unit according to claim 4, further comprising:
a pressure difference adjustment mechanism configured to decrease a pressure difference between the high-pressure flow path and the low-pressure flow path before a start of state switching of the switching mechanism or in the state switching.

10. A refrigeration apparatus comprising:
a refrigerant circuit configured to perform a refrigeration cycle in which a pressure above a critical pressure is applied to a refrigerant; and
the refrigeration apparatus-use unit according to claim 1.

11. A refrigeration apparatus comprising:
a refrigerant circuit configured to perform a refrigeration cycle in which a pressure above a critical pressure is applied to a refrigerant; and
the heat source unit according to claim 4.

* * * * *